United States Patent [19]

McAdams et al.

[11] Patent Number: 6,015,540
[45] Date of Patent: Jan. 18, 2000

[54] METHOD AND APPARATUS FOR THERMALLY REACTING CHEMICALS IN A MATRIX BED

[75] Inventors: Stephen R. McAdams, San Ramon; Bradley L. Edgar, Berkeley; Richard J. Martin, San Jose; Marvin M. Kilgo, Pasadena, all of Calif.; Christopher B. Baer, Knoxville, Tenn.; John D. Stilger, San Jose, Calif.

[73] Assignee: Thermatrix, Inc., San Jose, Calif.

[21] Appl. No.: 08/922,189

[22] Filed: Sep. 2, 1997

[51] Int. Cl.⁷ ............... C01B 11/00; B01J 8/00; F23B 5/20; F23D 11/44

[52] U.S. Cl. ............ 423/659; 423/245.3; 431/7; 431/238

[58] Field of Search .............. 423/245.3, 659; 385/205; 431/7, 170, 238

[56] References Cited

U.S. PATENT DOCUMENTS

| | | |
|---|---|---|
| 1,812,341 | 6/1931 | Jaeger . |
| 2,795,054 | 6/1957 | Bowen, III .................... 34/35 |
| 2,976,853 | 3/1961 | Hunter et al. ................. 122/4 |
| 3,661,497 | 5/1972 | Castelluci et al. ............. 431/7 |
| 3,769,922 | 11/1973 | Furlong et al. ............ 110/28 J |
| 3,807,090 | 4/1974 | Moss ......................... 48/128 |
| 3,810,732 | 5/1974 | Koch ........................... 431/7 |
| 3,870,474 | 3/1975 | Houston .................. 23/277 C |
| 3,888,193 | 6/1975 | Kishigami et al. .......... 110/8 F |
| 3,895,918 | 7/1975 | Mueller ................... 23/277 C |
| 3,900,554 | 8/1975 | Lyon ......................... 423/235 |
| 3,942,264 | 3/1976 | Zenkner ...................... 34/35 |

(List continued on next page.)

FOREIGN PATENT DOCUMENTS 55-95030  12/1979  Japan .

OTHER PUBLICATIONS

Alternate Technologies for the Destruction of Chemical Agents and Munitions—National Research Council (1993).
Workshop on Advances in Alternative Demilitarization Technologies, Sep. 25–27, 1995, Hyatt Regency, Reston, Virginia.
Ser. No. 08/922,176, filed Sep. 2, 1997.
Ser. No. 08/729,850, filed Oct. 15, 1996.
Ser. No. 08/921,815, filed Sep. 2, 1997.
Burke, S.P. et al., "Diffusion Flames", First Symposium (International) on Combustion, 1954, 2–11.

*Primary Examiner*—Gary P. Straub
*Assistant Examiner*—Cam N. Nguyen
*Attorney, Agent, or Firm*—Woodcock Washburn Kurtz Mackiewicz & Norris LLP

[57] ABSTRACT

An improved method and apparatus is provided for thermally reacting chemicals in a matrix bed of porous inert media. The reaction is conducted in an apparatus that is capable of establishing and maintaining a non-planar reaction wave within the matrix bed. The positioning of the non-planar reaction wave permits the interior surfaces of the vessel to be maintained at a temperature at least above 175° F. The apparatus includes a vessel that contains the matrix bed; one or more feed tubes that extend into the matrix bed, where preferably an exterior portion of each of the feed tubes that passes through the vessel is insulated; an exhaust outlet; and a means for heating the matrix bed. The non-planar reaction wave is established by heating at least a portion of the matrix bed to at least the reaction temperature of the chemicals and feeding a process stream containing the chemicals to be reacted into the feed tubes. Upon exiting the feed tubes, the process stream is reacted in a non-planar reaction wave to produce heat and the reacted process stream. The heat from the non-planar reaction wave maintains the interior surfaces of the vessel at a temperature of at least 175° F. during operation of the vessel. The reacted process stream is then directed to the exhaust outlet of the vessel.

42 Claims, 8 Drawing Sheets

U.S. PATENT DOCUMENTS

| | | | |
|---|---|---|---|
| 4,047,876 | 9/1977 | Rice | 431/7 |
| 4,252,070 | 2/1981 | Benedick | 110/211 |
| 4,259,088 | 3/1981 | Moss | 48/212 |
| 4,267,152 | 5/1981 | Benedick | 422/111 |
| 4,284,401 | 8/1981 | Tatebayashi et al. | 431/7 |
| 4,400,356 | 8/1983 | McVay et al. | 422/171 |
| 4,475,884 | 10/1984 | Shang et al. | 431/170 |
| 4,529,374 | 7/1985 | Malik et al. | 431/7 |
| 4,627,812 | 12/1986 | Kelly et al. | 431/7 |
| 4,643,667 | 2/1987 | Fleming | 431/7 |
| 4,646,660 | 3/1987 | Björkman et al. | 110/210 |
| 4,688,495 | 8/1987 | Galloway | 110/250 |
| 4,716,844 | 1/1988 | Koch | 110/341 |
| 4,741,690 | 5/1988 | Heed | 431/7 |
| 4,785,768 | 11/1988 | Brown et al. | 122/4 |
| 4,807,695 | 2/1989 | Ward | 165/4 |
| 4,823,711 | 4/1989 | Kroneberger et al. | 110/236 |
| 4,828,481 | 5/1989 | Weil et al. | 431/7 |
| 4,832,711 | 5/1989 | Christel, Jr. et al. | 55/20 |
| 4,838,782 | 6/1989 | Wills | 431/166 |
| 4,941,415 | 7/1990 | Pope et al. | 110/235 |
| 4,953,512 | 9/1990 | Italiano | 122/4 |
| 4,974,530 | 12/1990 | Lyon | 110/346 |
| 5,147,201 | 9/1992 | Xiong | 431/326 |
| 5,165,884 | 11/1992 | Martin et al. | 431/7 |
| 5,188,804 | 2/1993 | Pace et al. | 422/111 |
| 5,320,518 | 6/1994 | Stilger et al. | 431/7 |
| 5,366,708 | 11/1994 | Matros et al. | 423/210 |
| 5,451,300 | 9/1995 | Matros et al. | 203/2 |
| 5,453,259 | 9/1995 | D'Souza | 423/245.1 |
| 5,533,890 | 7/1996 | Holst et al. | 431/5 |
| 5,571,491 | 11/1996 | Thunstrom | 423/245.3 |
| 5,601,790 | 2/1997 | Stilger | 422/168 |
| 5,635,139 | 6/1997 | Holst | 422/108 |
| 5,637,283 | 6/1997 | Stilger et al. | 423/245.1 |
| 5,650,128 | 7/1997 | Holst et al. | 423/240 R |

COMPARATIVE

METHOD AND APPARATUS FOR THERMALLY REACTING CHEMICALS IN A MATRIX BED

FIELD OF INVENTION

The present invention relates to an improved method and apparatus for the controlled thermal reaction of chemicals in a vessel containing a matrix bed containing porous inert media. More particularly, the present invention relates to a method and apparatus for reacting chemicals at high temperatures (such as for example greater than about 1000° F.), whereby a non-planar reaction wave is established and maintained in the matrix bed to carry out the reaction. The apparatus is designed to be capable of establishing and positioning the non-planar reaction wave so that the interior surfaces of the vessel are maintained at a temperature of at least about 175° F.

BACKGROUND OF THE INVENTION

Many industries, (such as the chemical, pharmaceutical, oil refinery, power utility, and electronic) react chemicals at high temperatures. By "high temperatures" it is meant temperatures preferably greater than about 1000° F. and more preferably greater than about 1400° F. By "react" or "reaction" it is meant any chemical reaction which is exothermic (such as the synthesis, destruction, oxidation, or reduction of a chemical). For example, the oxidation may be to safely destroy a chemical by conversion to such reaction products as carbon dioxide and water, or to combust a chemical to generate energy. The reduction may be for example to reduce nitrogen dioxide to nitrogen. By "chemical," it is meant any reactable compound—whether a gas, liquid, or solid. The chemical may be, for example, organic material (such as any carbon containing compound), emissions or fumes containing an oxidizable or reactable compound from a chemical processing plant, fuel gas (such as methane) used to generate energy, liquid chemical waste from a chemical reaction, or chemical agent weapons or munitions (such as nerve gas, blister, or mustard agents).

One type of apparatus that can be used for the high temperature reaction of chemicals is a flameless matrix bed reactor. Flameless matrix bed reactors are described, for example, in U.S. Pat. Nos. 5,165,884 to Martin, et al., hereinafter referred to as "Martin," and 5,320,518 to Stilger, et al., hereinafter referred to as "Stilger," both of which are incorporated by reference herein in their entireties. In general, flameless matrix bed reactors operate by thermally reacting a process gas stream containing chemicals within a matrix bed of porous inert media (PIM). The matrix bed may be, for example, a random or non-random packed bed of heat resistant material (such as ceramic balls or saddles). The reaction is called flameless because the porous inert media permits the reaction to occur outside normal flammability limits of a reaction mixture containing air or oxygen.

The reaction of the process gas stream within the reactor is preferably carried out in a manner to establish and maintain a reaction wave in the matrix bed. This reaction wave is observed as a steep increase in matrix bed temperature, from ambient on the inlet side of the wave, to approximately the adiabatic reaction temperature of the mixture on the outlet side of the wave. This rapid change in temperature usually takes place over a distance of several inches in a typical reactor, with the actual distance usually dependent upon several physical and chemical properties.

For example, Martin discloses a flameless matrix bed reactor capable of forming a stabilized reaction wave. In Martin, a gas or vapor stream is fed into a matrix bed of heat resistant material contained within the reactor. The gas or vapor stream comprises at least one of the chemicals to be reacted. At least a portion of the matrix bed is initially heated to a temperature above the reaction temperature of the gas or vapor stream, to permit rapid reaction of the gas or vapor stream within the matrix bed.

Martin teaches that a reaction wave can be established in the reactor and can be observed by monitoring the temperature along the flow path of the gas or vapor stream. The reaction wave may be maintained at a relatively constant location within the bed by monitoring the temperature within the matrix bed and, in response, controlling the flow of any of the feed streams. The preferred flameless reactor in Martin establishes a reaction wave within the matrix bed that has a relatively flat cross-sectional profile perpendicular to the direction of flow. This reaction wave is characterized by a profile that has a substantially uniform temperature distribution at a given cross-sectional area perpendicular to the direction of flow. This reaction wave profile is hereinafter referred to as a "planar reaction wave." Such a planar reaction wave is shown in Comparative FIG. 1.

Referring to Comparative FIG. 1, there is shown a schematic of the internal temperature zones in a flameless matrix bed reactor (10) that contains a planar reaction wave (22). The flameless reactor includes a vessel (25), having a matrix bed of porous inert media (29). The vessel is lined with a refractory material (24). Prior to the planar reaction wave, there is typically a cool zone (27) that has a temperature below the uniform reaction temperature. After the planar reaction wave (22), there will be a hot region (26) that is typically at least above 1200° F. By using temperature sensors (20), the planar reaction wave (22) may be located within the matrix and moved to a desired point by controlling the output end of a process controller (28).

A disadvantage to this planar reaction wave temperature profile is that in the cool zone (27), corrosive products or reactants (such as acid gases or their pre-cursors) can condense on the interior surfaces (23) of the vessel (25). This condensation can occur when the corrosive products or reactants migrate through the lining of refractory material (24) adjacent to the interior surfaces (23) of the vessel (25). Additionally, if the vessel is constructed of heat resistant metal alloys, and there is no internal lining of refractory material, corrosive products or reactants can still condense on the interior surfaces of the vessel in the cool zone (27). This condensation in turn can lead to corrosion of the interior surfaces of the vessel. Consequently, this condensation is problematic because, without using additional means to heat the walls in the cool zone (27), the life of the vessel is reduced and/or more expensive materials of construction may be needed to improve corrosion resistance.

In addition to potential corrosion problems, a flameless matrix bed reactor that generates a planar reaction wave is limited in its overall volumetric reaction rate because the reaction wave cross-sectional area is equal to the vessel cross-sectional area (i.e., the ratio of the reaction wave cross-sectional area to the vessel cross-sectional area is one). As a result, there is a limit to the overall volumetric flow rate of gas or vapor stream to be reacted, because increasing the volumetric flow rate of the gas or vapor stream beyond a certain maximum results in pushing the planar reaction wave out of the matrix bed, regardless of the matrix bed length. Consequently, to accommodate increased volumetric flow rates, the cross-sectional area of the matrix bed must be increased. However, this increase in area increases the cost of the reactor and may create installation problems where space is limited.

The limit to the overall volumetric flow rate in a planar reaction wave also undesirably limits the turndown ratio. "Turndown ratio" means the ratio of the maximum permitted volumetric flow rate of a process stream such that the chemicals are substantially reacted in the matrix bed, to the minimum permitted volumetric flow rate such that the reaction occurs in the matrix bed. A large turndown ratio is desirable so that a matrix bed reactor can accommodate a variety of flow rates for a given process stream.

Additionally, the planar reaction wave requires substantial monitoring of the temperature along the matrix bed if repositioning of the reaction wave is desired. This monitoring undesirably adds to the cost of the reactor and increases the complexity of the control system.

Although Martin discloses the possibility of using many types of reaction waves, Martin does not recognize methods of using certain reaction waves in overcoming the above aforementioned problems.

Stilger discloses another example of a flameless matrix bed reactor that recuperates or recovers the heat from the reaction. In Stilger, gas or vapor to be reacted enters a plenum in the reactor and is directed through the plenum into one or more feed tubes contained within the matrix bed. The gas or vapor flows through the feed tubes and exits the feed tubes into either the top portion of the matrix bed or the void space above the matrix bed. The reaction preferably occurs immediately after the gas or vapor exits the tubes. The gas or vapor is then directed through the matrix bed, in a direction opposite the flow of the gas or vapor entering the feed tubes, to the reactor outlet. The reacted gas or vapor as it passes through the matrix bed is used to deliver energy, by means of heat transfer across the walls of the feed tubes, to the gas or vapor in the feed tubes. The heat from the reacted gas or vapor may also be used to heat other systems or process fluids.

In Stilger, preferably a homogeneous well-mixed reaction zone is established in the matrix bed immediately following the exit ends of the feed tubes. This homogeneous well-mixed reaction zone is established through the configuration and sizing of the feed tubes, and heating the gas or vapor in the feed tube to a sufficient temperature such that when the gas or vapor exits the feed tube, the reaction of the gas or vapor occurs immediately. The well-mixed reaction zone is characterized in having a uniform temperature and composition at a given cross-sectional area.

The reaction zone established in Stilger also has the disadvantage of having a cool zone where the condensation of corrosive compounds can occur. This cool zone is located in the vessel where the feed tubes are located. Additionally, the overall volumetric reaction rate is limited by the cross-sectional area of the reaction zone. As a result, there is a limit to the overall volumetric flow rate of the gas or vapor because increasing the gas or vapor volumetric flow rate results in pushing the reaction zone down along the feed tubes where temperatures are too low for efficient reaction. Even though Stilger discloses the possibility of using many types of reaction waves, Stilger does not recognize methods of using certain reaction waves in overcoming the above aforementioned problems.

Other examples and variations of flameless matrix bed reactors are disclosed in U.S. Pat. Nos. 4,688,495; 4,823,711; 5,533,890; 5,601,790; 5,635,139; 5,637,283; 5,650,128; and the U.S. patent application Ser. No. 08/659,579 entitled Thermal Oxidizers with Improved Preheating Means and Processes for Operating Same, filed on Jun. 6, 1996, all of which are incorporated by reference herein in their entireties. However, these designs result in the volumetric flow rate being limited based on the reactor cross-sectional area and /or tend to be complicated in design.

It is therefore an object of the present invention to provide a simplified flameless matrix bed reactor which is capable of processing gas and liquid streams where the liquid streams can be vaporized within the reactor.

It is another object of the present invention to provide a flameless matrix bed reactor that is designed to prevent condensation of process streams on the interior surfaces of the vessel so as to allow for the use of less expensive materials of construction.

It is another object of the present invention to provide a flameless matrix bed reactor wherein the maximum volumetric flow rate may be increased for a given cross-sectional area size.

It is another object of the present invention to provide a flameless matrix bed reactor with greater turndown where the relocation and monitoring of the reaction wave is minimized.

These and other objects will be apparent from the following description, appended drawings, and from practice of the invention.

SUMMARY OF THE INVENTION

The present invention provides a method of reacting one or more chemicals in a vessel having a matrix bed of porous inert media. The method includes forming a process stream containing the chemicals; heating at least a portion of the matrix bed to at least the reaction temperature of the one or more chemicals; feeding the process stream into the vessel through one or more feed tubes extending into the matrix bed; directing the process stream through the feed tubes and into the matrix bed, where the process stream exiting the feed tubes is homogeneous and is below the reaction temperature of the one or more chemicals; establishing and maintaining at least one non-planar reaction wave in the matrix bed, where at least a portion of the chemicals are reacted in the non-planar reaction wave to form heat and a reacted process stream and the heat from the non-planar reaction wave maintains the interior surfaces of the vessel at a temperature of at least about 175° F. during operation of the vessel; and directing the reacted process stream from the matrix bed into an exhaust outlet of the vessel.

The present invention also provides an apparatus for reacting one or more chemicals in a matrix bed. The apparatus includes a vessel comprising a matrix bed and having interior surfaces, an entrance side, an end side opposite to the entrance side and at least one exhaust outlet; a void space located between the matrix bed and entrance side of the vessel, where the exhaust outlet is connected to the matrix bed or void space; and one or more feed tubes, where the feed tubes enter the vessel through the entrance side of the vessel and extend into the matrix bed, where at least a portion of the exterior of each of the feed tubes that passes through the entrance side of the vessel is preferably insulated. The vessel also includes means for heating at least a portion of the matrix bed to the reaction temperature of the one or more chemicals; a mixing device capable of providing a homogeneous process stream to the matrix bed; and means for maintaining at least one non-planar reaction wave in the matrix bed in a manner such that the non-planar reaction wave provides heat for maintaining the interior surfaces of the vessel at a temperature of at least about 175° F. The vessel and feed tubes are designed so that the ratio of the length of the feed tube contained within the vessel to the vessel length measured from the vessel end to the vessel exhaust outlet is from about 0.1 to about 0.9 and the total cross sectional area of the feed tubes to the vessel cross-sectional area is from about 0.005 to about 0.5.

In an embodiment of the invention, liquids can be introduced into the process stream. When liquids are introduced into the process stream, preferably the interior surfaces of the feed tubes are maintained above a temperature to prevent liquid vapor from condensing on the interior surfaces of the feed tubes and to enhance the vaporization of liquid droplets. In this embodiment, it is preferred that the feed tubes contain less than 5 volume percent packing of porous inert media.

In another embodiment of the present invention, the mixing device that provides a homogeneous process stream to the matrix bed, is located within the feed tube.

The method and apparatus of the present invention have many advantages including, for example, that through the establishment of a non-planar reaction wave, increased volumes of a process stream may be reacted in a controlled manner. Additionally, the non-planar reaction wave provides for increased turndown ratios that result in the reactor being able to better accommodate process streams of varying concentrations and flow rates

BRIEF DESCRIPTION OF THE DRAWINGS

Comparative

DETAILED DESCRIPTION OF PREFERRED EMBODIMENTS

The flameless matrix bed reactor of the present invention includes a vessel having a matrix bed of porous inert. The vessel also has one or more feed tubes for receiving a reactable process stream, where at least a portion of the exterior of each of the feed tubes that passes through the vessel is insulated; and at least one outlet for removing the reacted process stream. The flameless matrix bed reactor also has means for heating at least a portion of the matrix bed to a temperature of at least the reaction temperature of the one or more chemicals and has a mixing device for providing a homogeneous reactable process stream to the matrix bed. "Reactable process stream," means a mixture comprising the chemical or chemicals to be reacted. For example, in an oxidation reaction the process stream may contain an oxidizable material and optionally an oxidizing agent, such as air or oxygen. The oxidizable material may be for example, organic material, organic emissions or fumes; fuel gas (such as methane); liquid chemical waste; or chemical agent weapons or munitions (such as nerve gas, blister, or mustard agents). Suitable oxidizable material includes, for example, simple hydrocarbons, oxygenated hydrocarbons, aminated hydrocarbons, halogenated compounds, and sulfur-containing compounds. "Gas," as used herein, refers to either a gas or vapor.

The design of the feed tubes and vessel (such as the vessel size and the size and orientation of the feed tubes relative to the vessel) permits the formation of a controllable non-planar reaction wave that results in a "hot wall" vessel. By "hot wall," it is meant that the interior surfaces of the vessel are maintained at a temperature of at least about 175° F., preferably at least about 250° F., more preferably at least about 300° F., and most preferably at least about 350° F. By "interior surfaces," it is meant the internal walls of the vessel that are exposed to the reacted or unreacted process stream by any means. For example, if the interior of the vessel is lined with one or more refractory materials, the process stream could migrate through the lining to contact the interior surfaces of the vessel. By "non-planar," it is meant that all of the elements of a feature do not define a single plane, even though individual elements of the feature may define one or more planes. For example, the non-planar reaction wave may be observed as a non-flat, substantially spherical, semi-spherical, spherical or bullet-shaped profile. Preferably, the non-planar reaction wave is in the shape of a semi-spherical, substantially spherical, or spherical reaction wave.

Figure 2:
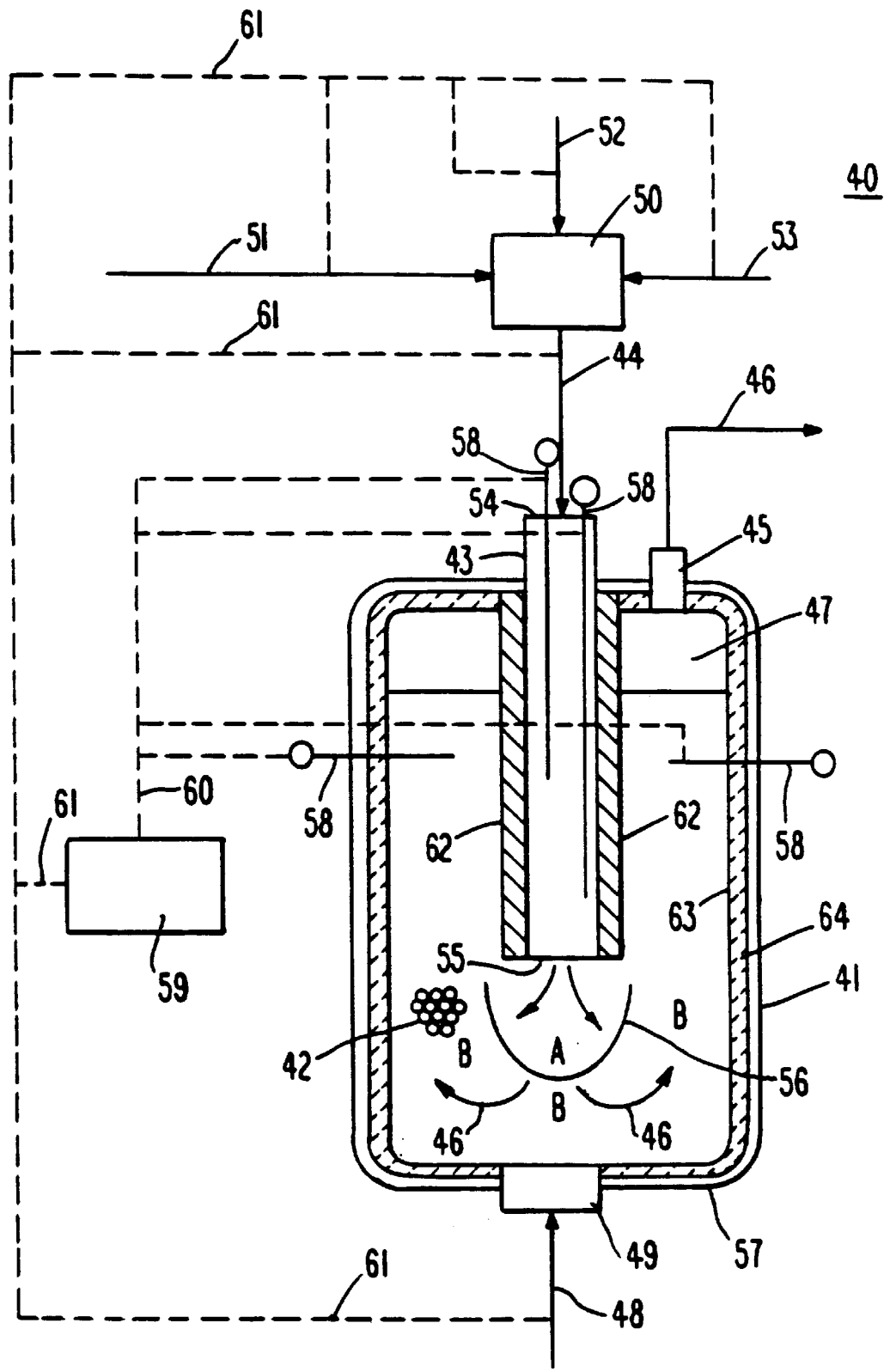
FIG. 2 is a schematic representation of an embodiment of the present invention.

Referring to the Figures, where like reference numerals refer to like elements, FIG. 2 shows an embodiment of a flameless matrix bed reactor (40) of the present invention which is being used to oxidize one or more chemicals. In FIG. 2, the flameless matrix bed reactor includes a vessel (41), containing a matrix bed (42) of porous inert media; a vessel refractory lining (63), located adjacent to the vessel interior surfaces (64); a feed tube (43) for receiving a reactable process stream (44), where a portion of the feed tube (43) that passes through the vessel is insulated with a refractory lining (62); an exhaust outlet (45) for removing reacted process stream (46); and a void space (47) located above the matrix bed (42). The matrix bed (42) is heated by introducing a heated medium (48), such as air, through a heating inlet (49). The reactable process stream is formed by combining in a mixing device (50) a fume stream (51) containing an oxidizable material, an optional oxidizing agent stream (52) (such as air or oxygen), and an optional supplementary fuel gas stream (53).

After the reactable process stream is formed, it is (54) fed into a feed inlet (54) of the feed tube (43). The reactable process stream is then directed to the exit (55) of the feed tube (43). A non-planar reaction wave (56) is established in the matrix bed located in a region approximately around the exit (55) of the feed tube (43) and the bottom (57) of the vessel. The reactable process stream (44) is reacted (in this embodiment oxidized) in the non-planar reaction wave (56) to produce the reacted process stream (46). The reacted process stream (46) is directed through the matrix bed (42), through the void space (47), and out the exhaust outlet (45). The exhaust outlet (45) is positioned so that the reacted process stream (46) prior to exiting the vessel (41) flows countercurrent to the flow direction in the feed tube (43). The exhaust outlet (45) may be connected to either the void space (47) or matrix bed (42). However, it is preferred that the exhaust outlet be connected to the void space (47). Temperature sensors (58) may be used for monitoring the temperature in the flameless matrix bed reactor (40). A process controller (59) may be used for accepting input from the temperature sensors (58) and, in response thereto, controlling the flow rate of the reactable process stream (44), the fume stream (51), the optional oxidizing agent stream (52), the optional supplementary fuel gas stream (53), and the heated medium (48).

Turning to the design of the feed tubes and vessel for establishing and maintaining a non-planar reaction wave that produces a hot wall vessel, the cross-sectional area of the feed tube is designed so that the linear velocity of the reactable process stream in the feed tube, hereinafter referred to as "linear gas velocity," is greater than the "reaction velocity" of the process stream. By "linear gas velocity," we mean the average actual rate of motion of the reactable process stream (i.e., interstitial velocity), expressed in units of length per time at standard temperature and pressure. The "reaction velocity" is a function of the properties of the process stream and the matrix bed. However, for a given process stream and matrix bed, the reaction velocity, expressed in units of length per time, is defined to be equal in magnitude, but in an opposite direction, to the linear gas velocity at the location where the reaction wave is stationary. Preferably, in the feed tubes, the linear gas velocity is from about 1 to about 200 times the reaction velocity, more preferably from about 1.5 to about 100 times the reaction velocity, and most preferably from about 2 to about 10 times the reaction velocity. Additionally, the ratio of the total cross-sectional area of the feed tubes to the cross-sectional area of the vessel is such that, when the reactable process stream exits the feed tube, the linear gas velocity preferably decreases to approximately the reaction velocity of the process stream. This change in velocity of the reactable process stream, when exiting the feed tube, aids in establishing a stable non-planar reaction wave.

With respect to the sizing of the feed tubes, the length of the feed tubes is selected so that the reactable process stream exiting the feed tubes is homogeneous. By "homogeneous," it is meant that the chemicals in the reactable process stream are mixed or distributed enough to react in the non-planar reaction wave to form the desired reaction products. Preferably, the feed tube length is from about 0.5 to about 50.0 times, more preferably from about 1.0 to about 20.0 times, and most preferably from about 2.0 to about 10.0 times the diameter of the interior of the feed tube. The "diameter" when not circular, is defined herein to be the hydraulic diameter (i.e., four times the cross-sectional area divided by the perimeter). Relative to the vessel, the ratio of the total cross-sectional area at the exit end of the feed tubes to the cross-sectional area of the vessel is preferably chosen to provide the desired ratio between the reaction velocity and linear gas velocity in the feed tube. The ratio of the total cross-sectional area at the exit end of the feed tubes to the cross-sectional area of the vessel, not accounting for any porous inert media or packing in the vessel or feed tubes, is preferably from about 0.005 to 0.5, more preferably from 0.01 to 0.4, and most preferably from 0.1 to 0.33, where the cross-sectional areas are measured at the feed tube exit and perpendicular to the flow. The ratio of the length of the feed tube contained within the vessel, to the vessel length measured from the vessel end to the vessel exhaust outlet is preferably from about 0.1 to about 0.9, more preferably from about 0.20 to about 0.80, and most preferably from about 0.20 to about 0.50. "Vessel end" refers to the side of the vessel that is opposite to the vessel side where the feed tubes enter (hereinafter referred to as the "entrance side" of the vessel). For example, in FIG. 2, the vessel end is the bottom (57) of the vessel.

With respect to the positioning of the feed tube within the vessel, the feed tube is positioned within the vessel to permit the establishment of at least one non-planar reaction wave in a location which produces a hot wall vessel. For example, if the distance measured from the centerline of the feed tube at the feed tube exit to the vessel end is too short or too long, the vessel will have cool walls. Preferably the distance measured from the centerline of the feed tube at the feed tube exit to the vessel end is from about 1.0 to about 10 times, more preferably from about 1.0 to about 8.0 times, and most preferably from about 1.0 to 3.0 times the feed tube diameter. Also, if the distance from the exit of the feed tube to the exhaust outlet is too long, the vessel walls close to the exit may become too cool to prevent condensation of corrosive reactant products or reactant by-products. Preferably the distance measured from the feed tube at the feed tube exit to the vessel exhaust outlet measured parallel to the direction of flow in the feed tube is from about 0.5 to about 10 times, more preferably from about 0.5 to about 8.0 times, and most preferably from about 0.5 to 2.0 times the vessel diameter. Most preferably, the exit of the feed tube is located approximately in the middle of the vessel measured from the vessel end to the vessel exhaust outlet.

With respect to the positioning of the feed tube relative to the cross-sectional area of the vessel, preferably the tubes are positioned to aid in maintaining a hot wall vessel. For example, when one feed tube is used, preferably the feed tube is positioned in approximately the center of the vessel so that the vessel walls are of equal distance to the center line of the feed tube. This positioning aids in centering the non-planar reaction wave within the vessel to aid in maintaining a hot wall vessel. However, it is also possible to use more than one feed tube. When more than one feed tube is used, the diameter and spacing of the feed tubes should be adjusted so as to form a discrete non-planar reaction wave in the matrix bed. The feed tubes are preferably installed in a regularly spaced manner. The ratio of the spacing between the tubes (measured center to center between the feed tubes) to the feed tube diameter is preferably from about 1.2 to about 15.0, and more preferably from about 1.5 to about 3.0. Preferably, for simplicity, one feed tube is used.

In order to prevent the reactable process stream from reacting in the feed tube or immediately upon exiting the feed tube, at least a portion of the exterior of the feed tube that passes through the entrance side of the vessel (i.e., located within the vessel) is preferably insulated with a refractory lining to prevent the reactable process stream from being heated by heat transferred from the reacted process stream. More preferably, the entire portion of each of the feed tubes located within the vessel is insulated with a refractory lining.

Overall, the refractory lining is chosen to maintain the reactable process stream at a temperature below the reaction temperature of the one or more of the chemicals. For example, in an oxidation, the temperature of the reactable process stream is preferably kept below the autoignition temperature of the process stream. The autoignition temperature of the process stream, as defined herein, is that temperature where spontaneous chain reactions occur between the oxidizable material and oxygen within the gas phase. Preferably, the reactable process stream in the feed tube is maintained at a temperature of less than about 800° F., and more preferably less than about 500° F.

The choice of a refractory lining will depend on the composition and reactivity of the reactable process stream. For example, in an oxidation, a reactable process stream containing more than about 1.5 weight percent oxidizable material, hereinafter referred to as an "organic rich process stream," will require a refractory lining with greater thermal resistance in comparison to a reactable process stream containing less than about 0.5 weight percent oxidizable material, hereinafter referred to as an "organic lean process stream." Suitable refractory insulating materials are, for example, Kaowool™, supplied by Thermal Ceramics; Cerablanket™, supplied by Premier Refractories; and Insuform™, supplied by A P Green. Preferred refractory linings are Kaowool and Cerablanket. Other examples of refractory linings can be found in PERRY'S CHEMICAL ENGINEER's HANDBOOK, 6th Ed., (1984).

The feed tube may be of constant or variable cross-sectional area. For example the tube cross-sectional area may be gradually increased along the length of the tube so as to form a cone shape. Also, the tube may optionally be varied in cross-sectional geometry. For example the cross-sectional area of the tube may be circular, elliptical, rectangular or square in shape.

Similarly, the vessel may be of any shape such as, for example, cylindrical, spherical, rectangular, or other geometry. The area of the cross-section of the vessel may be intentionally varied, such as, for example, a truncated cone or truncated pyramid. Additionally, the vessel may be oriented in various directions. For example, the vessel may be oriented in a vertical or horizontal direction.

Turning to the operation of the flameless matrix bed reactor (40) in FIG. 2, it is preferable that at least a portion of the matrix bed (42) is preheated prior to introducing the reactable process stream (44) into the flameless matrix bed reactor. At least a portion of the matrix bed is preferably heated to at least the reaction temperature of the one or more chemicals. For example, in an oxidation reaction, preferably the matrix bed (42) is heated to at least the autoignition temperature of the reactable process stream (44), and more preferably to a temperature of at least 1400° F. In a preferred operation, the matrix bed (42) is preheated to at least the reaction temperature in the region where the non-planar reaction wave will be located. As shown in FIG. 2, preferably the location of the wave is between about around the exit (55) of the feed tube (43) and the vessel bottom (57). Once the desired temperature has been reached in the matrix bed (42), heating may be ceased.

Any suitable means may be used for heating the matrix bed. For example, the heating means may be any heating device that will raise the temperature of the matrix bed directly or indirectly. The heating device may be mounted externally or internally. Heating devices include, for example: gas burners; electric heaters mounted exterior to or interior to the matrix bed; inductive heaters; radiant tube heaters; flameless thermal oxidizers located external to the matrix bed reactor, or combinations thereof. If the matrix is metallic, a resistive heater may be used.

FIG. 2 shows an embodiment of a heating device where a heating medium, such as air or any other suitable gas, is heated by an external heating device (not shown, such as an external flameless thermal oxidizer). The heated medium (48) is introduced into the flameless matrix bed reactor (40) through a heating inlet (49) and flows into the matrix bed (42). The heated medium (48) heats the matrix bed (42) and exits through the exhaust outlet (45). Alternatively, the heating inlet (49) can be located at other locations on the vessel (41) as long as the heated medium flowing through the heating inlet (49) is directed through at least a portion of the matrix bed. For example, the heating inlet (49) could be located at the top of the vessel (41), in the side of the vessel (41), or inside the feed tube (43).

Figure 3:
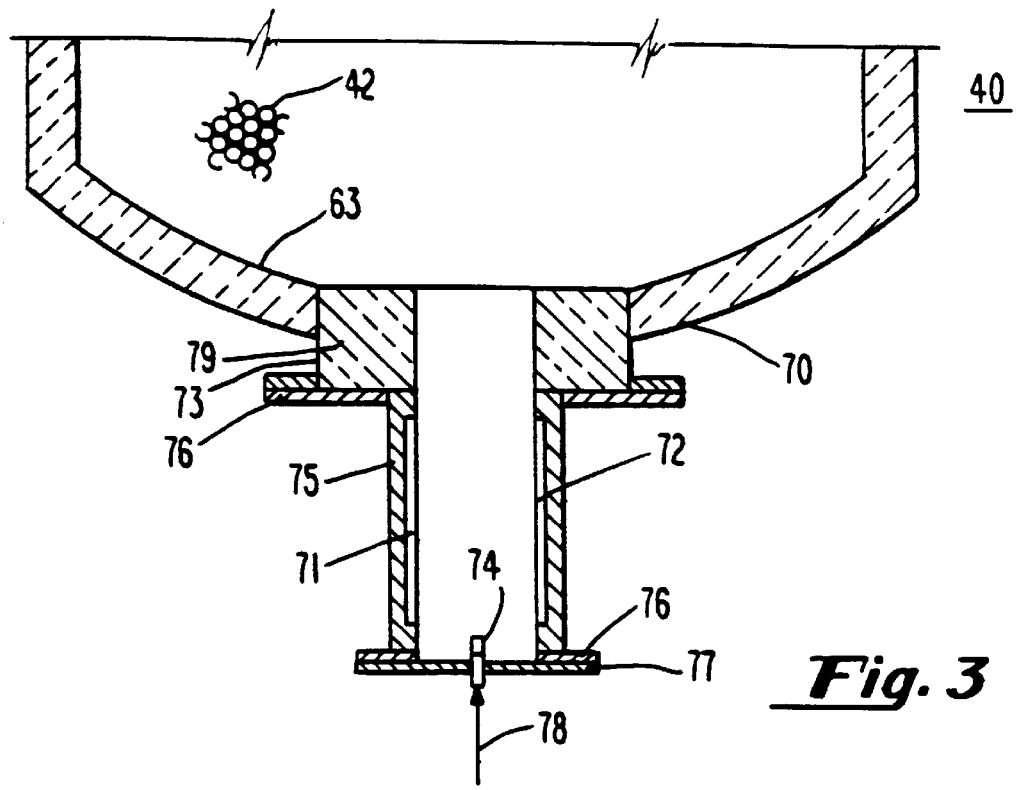
FIG. 3 is a schematic representation of a heating device useful in the present invention.

A more preferred embodiment of a heating device is shown in FIG. 3. FIG. 3 shows a bottom portion (70) of a flameless matrix bed reactor (40) that uses a heating assembly consisting of a ceramic fiber heater (71) (supplied for example by Watlow) that surrounds a cartridge (72) to heat the matrix bed (42). The cartridge (72) and ceramic fiber heater (71) are held by a spool (75) having flanges (76) and a bottom plate (77). The heating assembly is secured to a heating inlet (73) using the spool flanges (76). The heating assembly is mounted so that the cartridge (72) extends into the heating inlet (73) where it is insulated with an insulation sleeve (79). The heating assembly is preferably operated by using the ceramic fiber heater (71) to heat the center of the cartridge (72) to a desired temperature. A heating medium (78) containing air, fuel gas, or a combination thereof is then introduced through a sparger (74) that extends into the cartridge (72) through the bottom plate (77). The heating medium (78) is heated as it travels through the cartridge (72) and then flows through the heating inlet (73) into the bottom region of the matrix bed reactor to preheat the matrix bed (42) to the desired temperature.

In a preferred embodiment of FIG. 3, the heating medium (78) contains fuel gas (such as methane or propane). When the heating medium (78) contains fuel gas, it is preferable to heat the center of the cartridge to at least about a temperature of 200° F. to about 400° F. greater than the autoignition temperature of the heating medium (78). The heating medium (78) will then combust, and the products of combustion are used to preheat the matrix bed (42) to the desired temperature.

Figure 4:
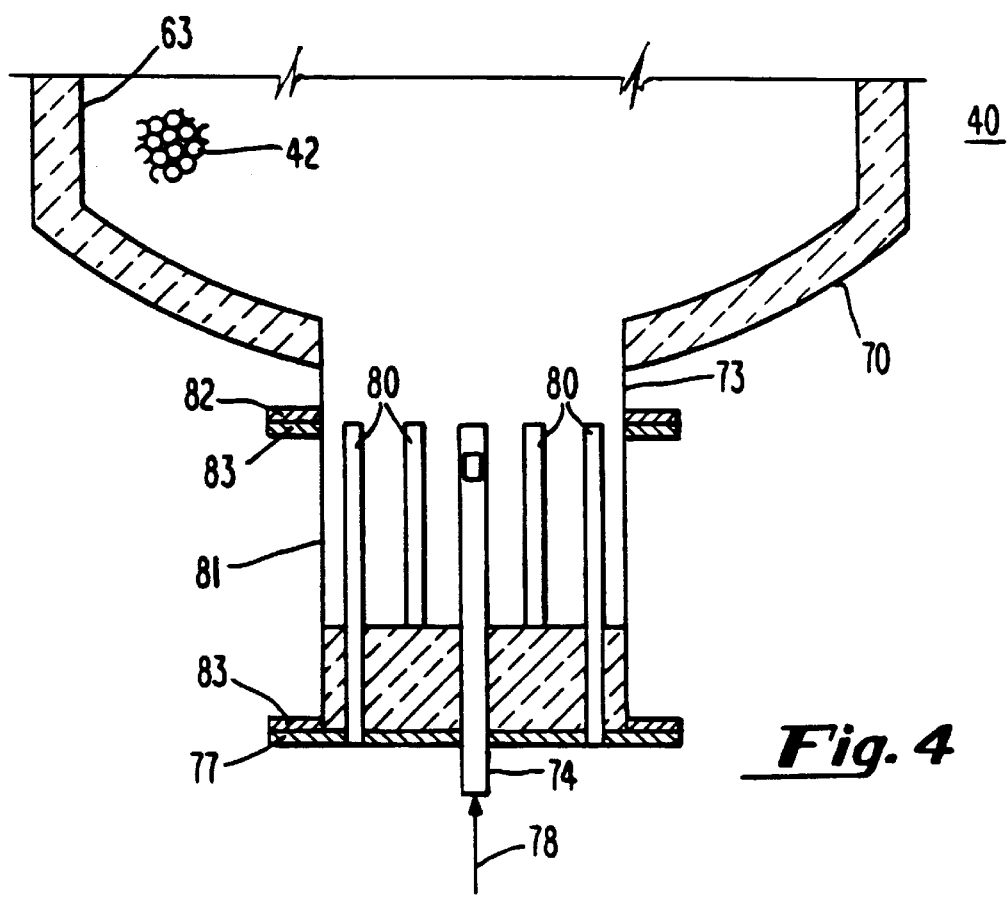
FIG. 4 is another heating device useful in the present invention which uses heating elements.

A most preferred embodiment of a heating device is shown in FIG. 4. FIG. 4 again shows the bottom portion (70) of a flameless matrix bed reactor (40). However, instead of using a ceramic fiber heater, internal heating elements (80) are used to heat the matrix bed. The internal heating elements (80) may be mounted to the bottom plate (77) and are encased within a spool (81) with spool flanges (83). The spool (81) containing the heating elements (80) may then be mounted to the heating inlet (73) using the heating inlet flange (82).

In heating the matrix bed (42), the heating elements (80) are preferably used to heat or combust the heating medium (78), which is fed through, and exits, the sparger (74). The heating medium (78), as in FIG. 3, may contain air, fuel gas, or a combination thereof Preferably the heating medium (78) contains fuel gas and the heating elements are used to combust the heating medium (78).

In a preferred embodiment of FIG. 3, the one or more heating elements may be mounted to a bottom plate, without the spool (81), and secured directly to a heating inlet flange (82). When one or more heating elements (80) are mounted to the heating inlet flange (82), the heating elements (80) can preferably extend into the matrix bed (42) and directly heat the matrix bed.

The heating elements (80) are preferably positioned so that they can ignite the reactable process stream. For example, if the heating elements are radially too close to the feed tube, they will not be able to ignite the reactable process stream. However, if the heating elements (80) are radially too far from the feed tube, more heating elements (80) will be needed to ignite the reactable process stream. Preferably, the heating elements (80) are located a radial distance of from about 0.1 to about 5.0, more preferably from about 0.2 to about 3.0 times the radius of the feed tube. Preferably, the heating elements are evenly spaced, and have a ratio of the total spacing between the heating elements (80) (measured between element centers) to the total feed tube diameter of preferably from about 1.0 to 6.0, and more preferably from about 2.0 to 4.0.

After the matrix bed is preheated, the reactable process stream (44) is fed into the inlet (54) of the feed tube (43) in FIG. 2. The reactable process stream (44) contains the chemical to be reacted. The chemical to be reacted may include one or more chemicals. For example, in an oxidation reaction, the chemical may include an oxidizable material and an oxidizing agent. The oxidizing agent may be any compound that provides oxygen for oxidizing the organic material (such as air or oxygen). The reactable process stream (44) may also optionally contain supplemental fuel to aid in the reaction. Preferably supplemental fuel is used to increase the temperature of the matrix bed reactor and to enhance the reaction of chemicals by providing a source of free radicals. The fuel may be for example natural gas, or hydrocarbons such as methane, propane, or butane.

The chemical in the reactable process stream may be a gas, liquid, or solid as long as the reactable process stream exiting the feed tube (43) is a gas or a gas containing finely divided solids. Preferably, the reactable process stream exiting the feed tube is a gas.

The direction of flow of the reactable process stream within the feed tubes may be varied provided that any packing, including the porous inert media, within the tube and vessel accounts for the flow direction. For example, if the flow direction is downward (with the pull of gravity), random packing is preferably used. If the flow direction is upward (against the pull of gravity) the packing is preferably structured. The direction of flow tubes may also be, for example, directed to feed left or right in a horizontal cylinder. Preferably, the direction of the reactable process stream is downward to enhance flow of the reactable process stream into the matrix bed and to eliminate the need for more costly structured packing. Due to the inherently stabilizing thermal mass of the matrix, the flow of the reactable process stream may also be introduced into the matrix bed in a continuous or intermittent manner.

The reactable process stream, upon entering the matrix bed, should preferably be homogeneous (as defined hereinbefore) and a gas or a gas containing finely divided solids. In order to provide a homogeneous mixture, a mixing device is preferably used prior to the reactable process stream entering the matrix bed to combine the components of the process stream together. The mixing device may be external or internal to the flameless matrix bed reactor. In a preferred embodiment the mixing device is located in the feed tubes. The mixing device may optionally be equipped with one or more nozzles to introduce the individual components into the mixing device. To mitigate the effects of an undesirable combustion in the mixing device, the mixing device is preferably designed to minimize the volume of chemicals it mixes so that any energy released from an undesired combustion is minimized.

Suitable mixing devices include, for example, static mixers, such as a venturi type or twisted insert static mixer, mixing tees, or a swirl mixer Preferably the mixing device is a mixing tee or swirl mixer.

FIG. 2 depicts an external mixing device (50) that receives a fume stream (51), an optional oxidizing agent stream (52), and an optional supplementary fuel stream (53). The mixing device combines these individual streams to form a homogeneous reactable process stream. Although the mixing device (50) in FIG. 2 is shown for an oxidation reaction, the mixing device (50) may be used to mix together any chemicals which are to be reacted.

Figure 5A:
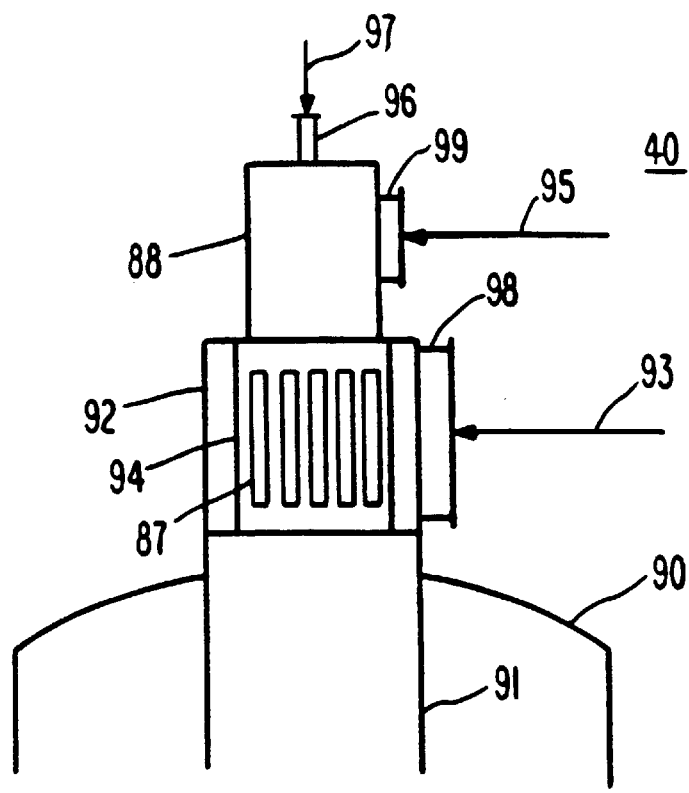
FIG. 5A is a schematic representation of a mixing device located internal in the feed tube.

A preferred mixing device is shown in FIG. 5A. FIG. 5A shows the entrance side of a vessel (90) of a flameless matrix bed reactor (40) that contains a swirl mixer and mixing tee (88) that is an integral part of a feed tube (91). The swirl mixer comprises a top portion (92) of the feed tube (91); a first inlet (98) for receiving a first component stream (93) into the top portion (92) of the feed tube; and an internal mixing tube (94) that has slots (87) to direct the flow from the exterior to the interior of the internal mixing tube (94). The mixing tee (88) comprises a second inlet (99) for receiving a second component stream (95), and optionally, a third inlet (96) for receiving a third component stream (97). Alternatively, the third inlet (96) may be replaced by a tube (not shown) which extends further into the mixing tee or into the swirl mixer.

In FIG. 5A, the component stream that has the largest volumetric flow rate is preferably fed tangentially into the top portion (92) of the feed tube (91) through the first inlet (98). The component stream that has the second largest volumetric flow rate is preferably fed through the second inlet (99) of the mixing tee (88). The component stream having the smallest volumetric flow rate is preferably fed into a third inlet (96). The first component stream (93), when fed tangentially into the feed tube (91) and into the swirl mixer, enhances mixing of itself with the second component stream (95) and third component stream (97). For example, in an oxidation reaction, an oxidizing agent such as air could be fed through the first inlet (98), a fume stream could be fed through the second inlet (99), and supplemental fuel could be fed through the third inlet (96).

Other useful mixing devices equipped internally within the feed tube include for example porous inert media (described hereinafter), static mixers, flame arrestors, or distributor plates. These mixing devices can also increase the safety of the system by preventing or stopping a flame from forming. Preferably, at least a portion of the tube is packed with porous inert media. More preferably, at least 10 percent by volume, and most preferably from about 20 to 80 percent by volume, based on the total feed tube volume.

Figure 5B:
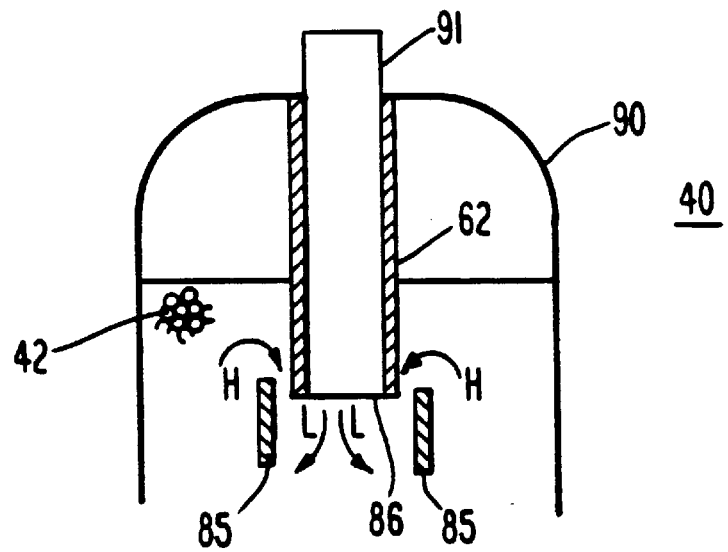
FIG. 5B is another mixing device located at the exit end of the feed tube.

Also to enhance mixing, optionally, at the end of the feed tube, there may be incorporated a secondary tube or a recirculation sleeve to increase the linear gas velocity of the process stream and to improve mixing at the exit of the feed tube. An embodiment of this mixing device is shown in FIG. 5B. In FIG. 5B, the entrance side of a vessel (90) is shown which is equipped with a feed tube (91). At the exit (86) of the feed tube (91) is located a recirculation sleeve (85). The recirculation sleeve (85) creates a low pressure region (L) so that the process stream outside of the recirculation sleeve, in a high pressure region (H), is drawn into the low pressure region (L) for enhanced mixing. The recirculation sleeve (85) may also be equipped with openings such as holes, gaps, louvers, slots, or vanes (not shown) to draft and recycle the process stream into the reaction region.

In an embodiment of the present invention, it may be desired to introduce a liquid into the reactable process stream. The liquid may be, for example, an oxidizable material that is desired to be combusted or destroyed, an inert carrier fluid, or an oxidizing agent. The introduction of a liquid into the process stream is possible as long as the liquid is vaporized and mixed with the reactable process stream prior to entering the matrix bed. The liquid may be vaporized prior to being introduced in the reactable process stream, or it may be added to the reactable process stream directly as a liquid.

If the liquid is not vaporized prior to being added to the reactable process stream, the liquid is preferably added to the reacted process stream as a mist or spray of liquid droplets. A mist or spray may be formed, for example, by using a nozzle to atomize the liquid. The nozzle may be, for example, a mechanical or fluid assisted nozzle. Preferably, atomization of the liquid is carried out using a fluid-assisted nozzle.

The liquid may be introduced as a spray directly into the feed tubes, or into a mixing device that combines the liquid spray with one or more components of the reactable process stream. Preferably, the liquid is atomized into a mixing device and uniformly combined in the mixing device with the other components of the reactable process stream prior to being fed into the feed tubes.

The liquid droplets may be vaporized in the reactable process stream using any suitable vaporization technique. For example, the liquid droplets may be contacted with a heated medium (such as a heated air stream), or may be directed through a heated apparatus (such as a mixer or tube). Other suitable techniques for introducing liquid to a flameless matrix bed reactor are, for example, disclosed in U.S. application Ser. No. 08/729,850 filed on Oct. 15, 1996, which is commonly owned by the assignee of the present application and which is incorporated herein in its entirety by reference.

To ensure that the liquid vaporizes or remains as a gas in the feed tubes, it is preferred to heat the interior surfaces of the feed tube to a temperature where liquid droplets will not wet the surfaces of the feed tubes. Preferably the interior surfaces of the tubes are maintained above the stable film boiling temperature of the liquid. The stable film boiling temperature of a liquid may be estimated for example by methods (preferably equations 8.56 and 8.57) disclosed in *Liquid-Vapor Phase Change Phenomena*, Van P. Carey, published by Taylor & Francis, (1992), incorporated herein in its entirety by reference. Preferably, the temperature of the interior surfaces of the tubes will be from about 100° F. to about 750° F. and more preferably from about 175° F. to 350° F. Although in no way intending to be limited by theory, it is believed that heating the interior surfaces of the feed tubes to above the stable film boiling temperature of the liquid prevents any vaporized liquid from condensing on the interior surfaces of the feed tubes, and also enhances the vaporization of any liquid droplets that contact the interior surfaces of the feed tubes. However, the interior surfaces of the feed tubes preferably should not be maintained at too high of a temperature, where decomposition of the liquid could occur.

In this embodiment of the invention, it may be desirable to use feed tubes which do not have an exterior refractory lining so that heat from the reacted process stream may be transferred to the interior surfaces of the feed tubes. Other means for heating the feed tubes include for example electric heating tape which is wrapped around each of the feed tubes. Also, it is preferable in this embodiment that each of the feed tubes contain less than 5 percent by volume packing and more preferably no packing of porous inert media.

This embodiment may also be used in U.S. application Ser. No. 08/729,850, filed on Oct. 15, 1996, in lieu of, or in addition to, the methods disclosed for vaporizing a liquid spray or mist.

After being fed into the feed tube, the reactable process stream is directed out of the feed tube and enters the matrix bed into a region where the matrix bed temperature is sufficient to react the process stream in at least one non-planar shaped reaction wave. Preferably, the non-planar reaction wave should be established entirely within the matrix. Also, to provide for a hot wall vessel, the non-planar reaction wave should not originate or be attached to any external wall. Also, preferably, the furthest point on the non-planar reaction wave (away from the feed tube exit) should be a distance from the tube exit ranging from about 0.1 to about 10 times the diameter of the feed tube.

The non-planar reaction wave is observed as a steep increase in matrix bed temperature, from ambient on the inlet side of the wave, to approximately the adiabatic reaction temperature of the process stream on the outlet side of the wave. The actual length of the wave is dependent upon feed concentrations, feed rates, gas velocity distribution, matrix bed material, and matrix bed physical properties, type of specific feed materials, etc. Heat losses in the direction of flow also will have an effect on the length of the wave.

A discrete non-planar reaction wave is established through adjusting such parameters as the matrix bed temperature, the feed rate of the reactable process stream and the composition of the reactable process stream. Also, as previously described herein, the size and spacing of the feed tubes, relative to the dimensions of the vessel aids in establishing a non-planar reaction wave. Preferably, the non-planar reaction wave is established in a region between about the exit of the feed tube and the end of the vessel. By "discrete," we mean an identifiable reaction wave is established where the chemicals in the process stream remain substantially unreacted until reaching the reaction wave, where substantially all of the chemicals are reacted over the wave length. By "substantially," we mean preferably at least 95 weight percent, and more preferably at least 99.99 weight percent of the chemical is reacted, based on the total weight of chemical.

An example of a non-planar reaction wave is shown in FIG. 2. In FIG. 2, region A, located between the exit of the feed tube and the non-planar reaction wave, typically has a temperature of about the temperature of the reactable process stream exiting the feed tube. Additionally, the composition of the process stream in region A is substantially the unreacted chemicals of the reactable process stream. However, in region B, located after the non-planar reaction wave, the temperature of the matrix bed is approximately the adiabatic reaction temperature of the reactable process stream and the composition of the process stream is substantially the reacted products of the process stream.

In connection with the location of the non-planar reaction wave, it is preferred that the ends of the non-planar reaction wave attach onto the feed tube to form a "bubble" around the feed tube. This bubble acts as a "hot seal" which inhibits unreacted chemicals in the process stream from migrating up the matrix bed towards the exhaust outlet (45) without being first directed into the non-planar reaction wave (56). This hot seal is preferably formed through preheating the matrix bed (42) to at least the reaction temperature in the region where the non-planar reaction wave will be located. Additionally, adjusting the amount of supplementary fuel in the reactable process stream can enhance the formation of the hot seal.

Once the non-planar reaction wave is established, the wave may be maintained and controlled by adjusting such variables as the flow rate of the process stream, or the composition of the process stream (such as increasing or decreasing the percentage of fuel, oxidizable material, or oxidizing agent in the process stream). The non-planar reaction wave is controlled, for example, to relocate the wave to another location within the matrix bed or to stabilize the position of the wave in one location, when, for example, the matrix bed is exposed to unplanned process fluctuations.

Preferably, the location, stability, and size of the wave may be controlled through a programmable control system. FIG. 2 shows a control system (59) that uses the outputs (60) from temperature sensors (58) to control the means for adjusting (61) the process stream composition, the process stream flow rate, and the flow rate of the heating medium. The control system (59) can also be used for controlling the means for adjusting the flow rate of supplemental fuel, or the flow rate of supplemental air or oxygen (not shown) into the matrix bed (42). For example, if the temperature declines in a specified location of the matrix bed, the control system (59) could send a signal, such as an electrical or pneumatic signal, to a control valve (not shown) to increase the flow rate of supplemental fuel, or to decrease the flow rate of supplemental air added to the flameless matrix bed reactor in order to prevent migration of the wave further away from the exit of the feed tube. Similarly, if the temperature increases in the non-planar reaction wave, the control system (59) could send a signal to a control valve (not shown) to decrease the flow rate of supplemental fuel or increase the flow rate of supplemental air added to the flameless matrix bed reactor in order to prevent the wave from migrating into the inside of the feed tube.

The control system (59), in addition to controlling the location and size of the non- planar reaction wave, may be used for controlling the preheating of the matrix bed (42) and for monitoring for undesirable conditions within the flameless matrix bed reactor (40). For example, the control system (59) can be used to control the preheating of the matrix bed (42) by modulating the flow of the heated medium (48) in the heating inlet (49). Also, for example, the control system (59) can receive analog and digital inputs from several instruments mounted in the flameless matrix bed reactor, including temperature sensors (58), and level switches (not shown), to detect undesirable conditions and to shut the flameless matrix bed reactor (40) down in a safe manner upon detection of an undesirable condition.

Preferably, the non-planar reaction wave is controlled in a manner so that it is self-sustaining, i.e., so that no external heat is required to maintain the matrix bed temperature once the matrix bed is initially preheated. However, if desired, heat can be introduced into the flameless matrix bed reactor while in operation.

In a preferred embodiment of the present invention, a heating device may be used as a "wave anchor" so that the volumetric flow rate of the reactable process stream can be increased beyond the maximum flow rate achievable when producing a self-sustaining reaction wave. Typically, the volumetric flow rate may be increased by at least 10%, and more preferably at least 50% compared to the maximum flow rate achievable when producing a self-sustaining reaction wave.

In a preferred embodiment, a heating device is turned on during the operation of the flameless matrix bed reactor to prevent the non-planar reaction wave from growing as the reactable process stream flow rate is increased. For example, in FIG. 2, a heated medium (48) of hot air, fuel, or a combination thereof may be introduced into the flameless matrix bed reactor (40) through the heating inlet (49) during normal operation. The heated medium (48) may then be used to "anchor" the non-planar reaction wave so as to prevent the wave from expanding if the flow rate of the reactable process stream is increased.

Alternatively, a heating device located within the matrix bed may be used to anchor the non-planar reaction wave. In such an embodiment, the heating device may be used as a "pilot," where the heating device is turned on as needed to prevent the wave from expanding. For example, the heating device shown in FIG. 4 may be used in such a manner. In such an embodiment, it is preferred that the heating elements (80) in FIG. 4 are mounted to the flameless matrix bed reactor (40) so that they extend into the matrix bed (42) proximate to the wave.

The process stream is maintained at the reaction temperature in the matrix bed for a sufficient residence time to ensure substantially complete reaction of the chemicals. For example, in the destruction or combustion of organic material it is preferred to substantially convert the organic material to such compounds as $CO_2$, $H_2O$, HCl, HF, $P_2O_5$ $SO_2$ etc. Preferably the residence time is greater than 50 milliseconds. The temperature of the reaction is dependent upon feed concentrations, feed rates, gas velocity distribution, bed physical properties, type of specific feed materials, heat losses, heat input from the heaters, etc. Preferably, the reaction temperature is at least 1000° F., and more preferably at least 1400° F.

After the reaction, the hot reacted process stream is directed though the matrix bed, countercurrent to the flow direction of the feed tube, and exits through the exhaust outlet. The reaction efficiency of the thermal matrix bed reactor when used as an oxidizer is at least about 99.9%, preferably at least 99.99%, more preferably at least 99.999%, and even more preferably at least 99.9999%, by weight. That is, at least that percent by weight of all reactable material entering the matrix bed reactor are reacted, within the matrix bed reactor. The space velocity of the gases in the heated reaction zone will typically be in the range of 1800 $hr^{-1}$ to 72000 $hr^{-1}$.

Turning to the materials of construction of the matrix bed reactor, the materials (such as for the feed tube and vessel) are chosen to be capable of withstanding the reaction conditions and containing the process streams during operation. Preferably, the vessel and feed tubes are constructed of a metal such as carbon steel, Haynes Alloy HR-160, 214 Haynes Alloy No. 214, Inconel Alloy No. 600, Inconel Alloy No. 601, Stainless Steel Nos. 309, 310 and 316. Preferably, the vessel is constructed of carbon steel, and the feed tube is constructed of two or more metals welded together such as carbon steel, and stainless steel (such as Stainless Steel No. 310).

The interior or exterior surfaces of the vessel may be lined with one or more refractory insulating materials. Preferably, the interior surfaces of the vessel are lined with one or more refractory materials so that the vessel does not have to be constructed of more expensive heat resistant metals. The refractory materials may be for example firebrick, optionally coated with a porosity-reducing compound, ceramic fiber board, or ceramic fiber blanket, or combinations thereof. In a preferred embodiment, the vessel is lined with dense castable refractory materials and backed up with insulating refractory materials, such as ceramic fiber board and ceramic fiber blanket. The vessel surfaces may also optionally be coated with a non-permeable, corrosion-resistant coating.

The matrix bed contains heat resistant inert porous media. Typical materials used to construct the matrix bed are made of ceramic materials, which may be randomly packed or structurally packed. Preferred random packing comprises ceramic balls that may be layered. Generally, for oxidation of hydrocarbon gases, the ceramic balls are useful if they have a diameter from about 0.0625 to 3 inches (0.159–7.62 cm), preferably about 0.75 inch (1.9 cm). Another useful configuration is the use of random ceramic saddles typically from 0.0625 to 3 inches (0.159–7.62 cm) nominal size, preferably about 0.5 to 1.5 inches (1.27–3.81 cm) nominal size. Other useful packing materials are pall rings and raschig rings with diameters from about 0.0625 to 3 inches (0.159–7.62 cm), and preferably from about 0.5 to 1.5 inches (1.27–3.81 cm). Other shapes of ceramic material may be utilized such as honeycomb shape ceramic.

A ceramic foam material may also be utilized to construct the matrix bed. Typical foam material that can be utilized has a void fraction of 10 to 99%, preferably 75 to 95%, and most preferably about 90%. The pore sizes in any preferred ceramic foam material will be about 0.1 to 1,000 pores per inch (0.04 to 400 pores per cm), preferably about 1 to 100 pores per inch (0.4 to 40 pores per cm), and most preferably about 10 to 30 pores per inch (4 to 12 pores per cm).

Instead of a ceramic, the heat-resistant material used to form the matrix bed may also be a metal, which may be randomly packed or may have a structured packing. A pre-designed, single piece metal structure can also be used to constitute the matrix bed, which structure can be secured to the vessel and thereby easily removed for maintenance purposes. Catalytic materials may be used in the matrix bed; however, it is preferred that the materials that constitute the matrix bed are non-catalytic.

Generally, the void fraction of the matrix bed will be between 0.3 and 0.9. In addition, the material in the matrix bed will typically have a specific surface area ranging from 40 $m^2/m^3$ to 1040 $m^2/m^3$. Preferably, the length of the matrix bed will extend from the end side of the vessel to at least about one tube diameter above the exit end of the feed tube.

Figure 6:
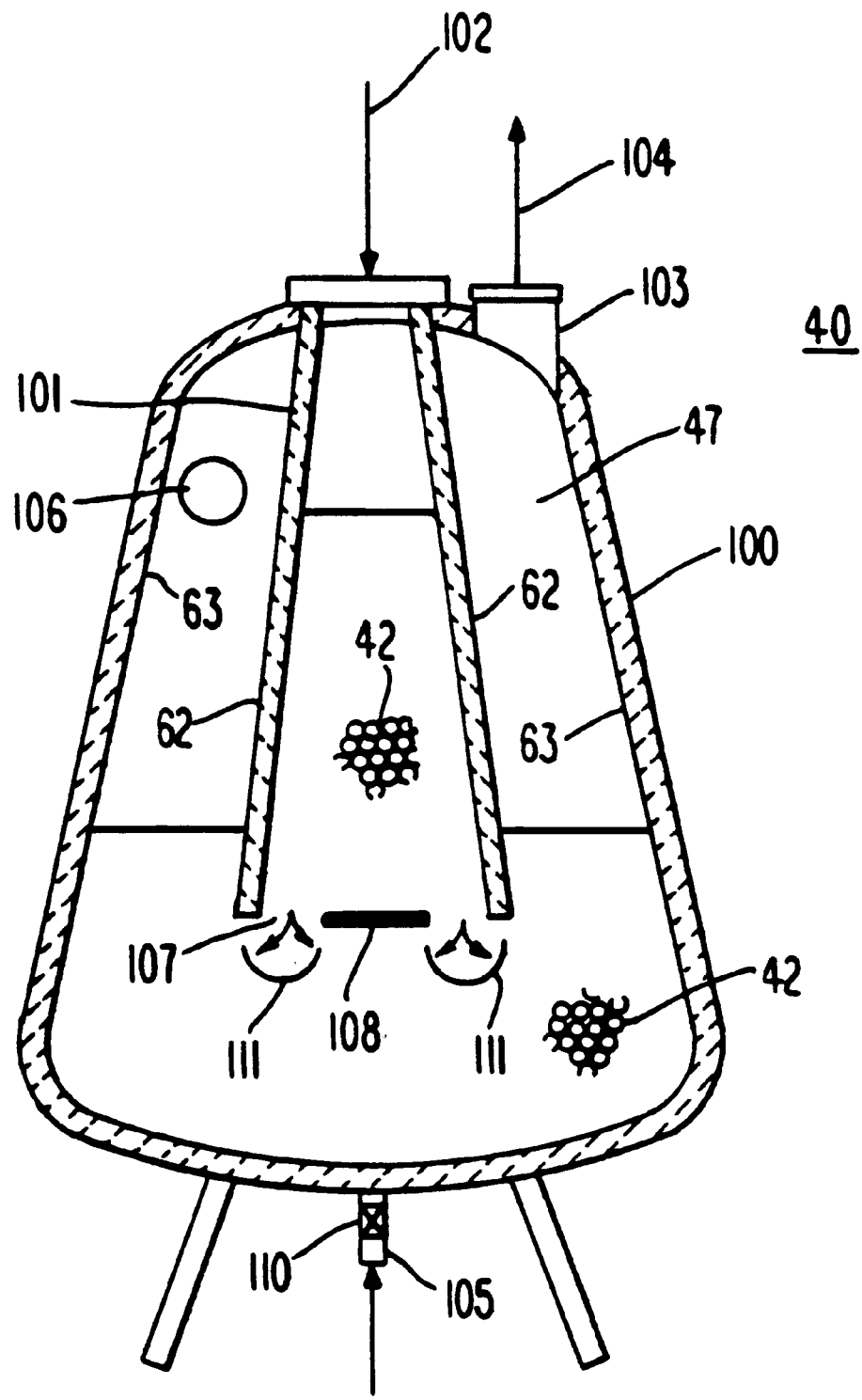
FIG. 6 is another embodiment of the present invention where more than one non-planar reaction wave is formed.

Referring to additional embodiments of the present invention, FIG. 6 shows an embodiment of the present invention where two discrete non-planar waves are formed. FIG. 6 shows a flameless matrix bed reactor (40) that includes a cone-shaped vessel (100) having a graduated feed tube (101) for receiving a reactable process stream (102), an exhaust outlet (103) for removing a reacted process stream (104), and a gas inlet (105) having a valve (110) for injecting supplemental air or fuel. The cone shaped vessel (100) contains a matrix bed (42) of porous inert media that fills a portion of the graduated feed tube (101). Located above the matrix bed (42) is a void space (47) where a heating inlet ((106) is located for heating the matrix bed (42). The matrix bed is heated by directing a heating medium (not shown) through the heating inlet and down to the gas inlet (105), where the heating medium exits. Once the matrix bed is heated, the reactable process stream (102) is fed into the graduated feed tube (101). The reactable process stream (102) is then directed to the exit (107) of the graduated feed tube (101) where a ceramic plate (108) is located. The ceramic plate (108) divides the process stream so that two non-planar reaction waves (111) are established in the matrix bed approximately between the exit (107) of the graduated feed tube (101) and the bottom of the cone shaped vessel (100). As an alternative to using a ceramic plate, a ceramic donut may be used to form multiple, discrete, non-planar reaction waves.

Figure 7A:
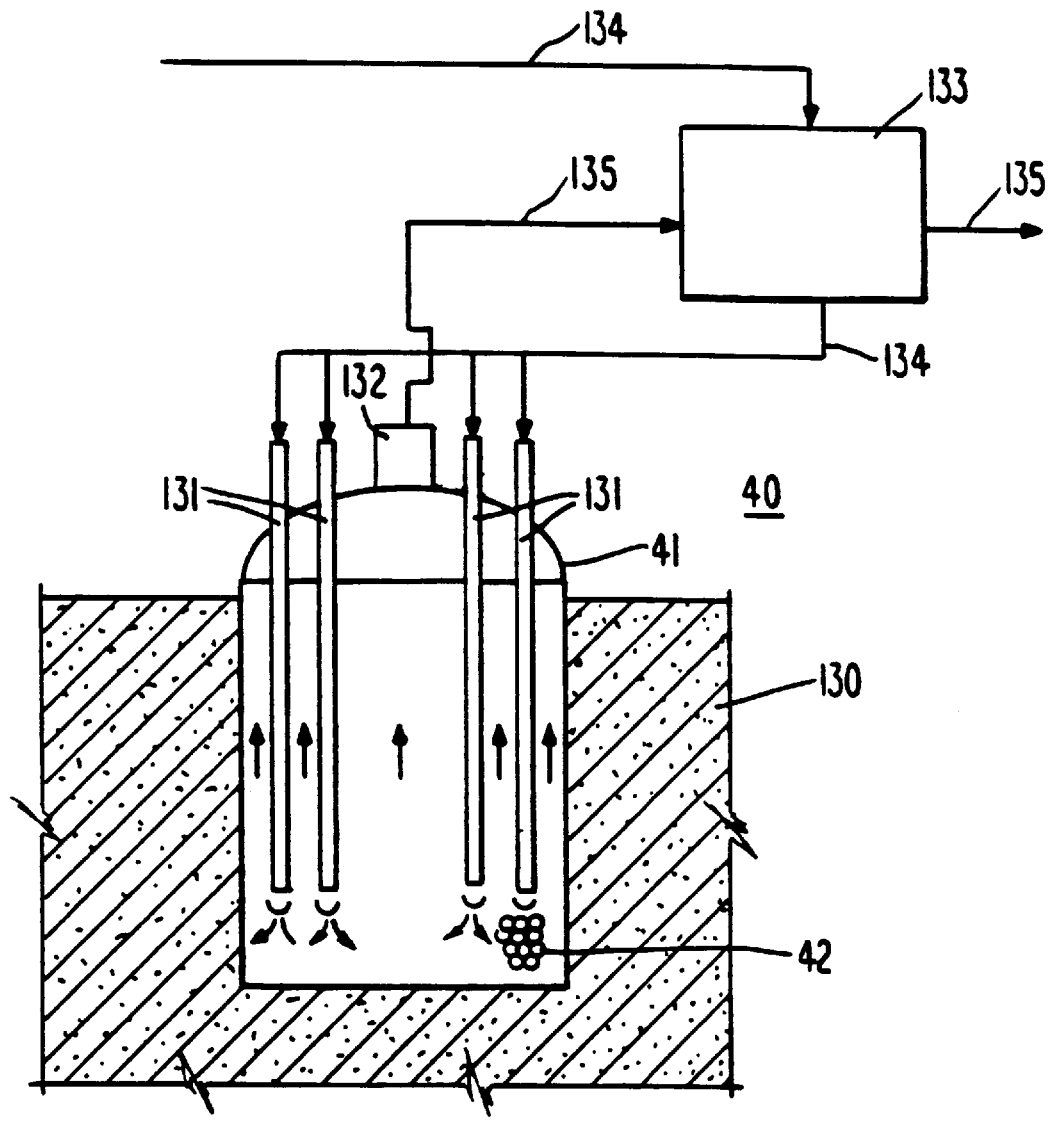
FIG. 7A is another embodiment of the present invention that is preferably used for reacting large volumetric flow rates of process streams.
Figure 7B:
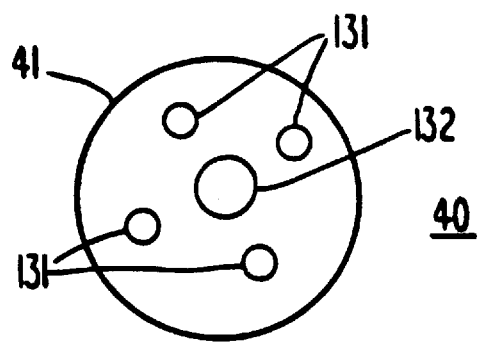
FIG. 7B is a top view of the embodiment shown in FIG. 7A.

FIGS. 7A and 7B show another embodiment of a flameless matrix bed reactor of the present invention where the vessel contains multiple feed tubes and is designed to be installed below grade. Such an embodiment is particularly useful when large flow rates (i.e., preferably greater than about 20,000 standard cubic feet per minute) of a reactable process stream are to be reacted. FIG. 7A shows a side view of the flameless matrix bed reactor (40) where the majority of the vessel (41) is located below grade (130). The vessel has multiple feed tubes (131) which are insulated (not shown) that extend into the matrix bed (42) of the vessel (41). The vessel also contains an exhaust outlet (132) that is in flow communication with a heat exchanger (133). The flameless matrix bed reactor (41) may be preheated prior to introducing the reactable process stream by one or more external or internal heating devices (not shown). A reactable process stream (134) is fed through the heat exchanger (133), where the heat from a reacted process stream (135) exiting the exhaust outlet (132) is used to preheat the reactable process stream (134). After the reactable process stream (134) is preheated, it is divided into the feed tubes (131). The spacing of the feed tubes (131) within the vessel (41) can be seen from a top view of the vessel (41) shown in FIG. 7B. In FIG. 7B, the feed tubes (131) are spaced concentrically around the exhaust outlet (132). The distance between the feed tubes is such that discrete non-planar reaction waves (111) are formed.

Figure 8A:
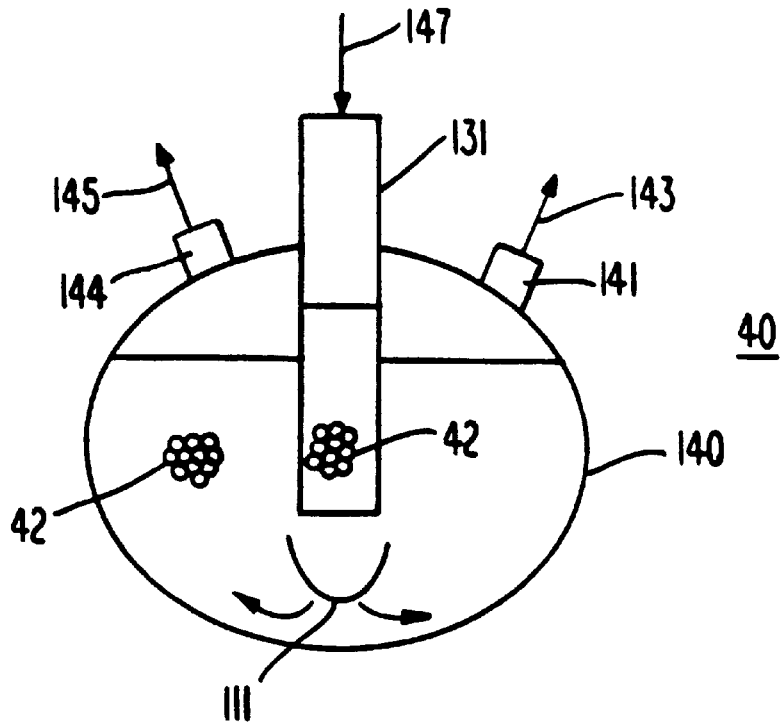
FIG. 8A is a side view of another embodiment of the present invention where the vessel is horizontally positioned.
Figure 8B:
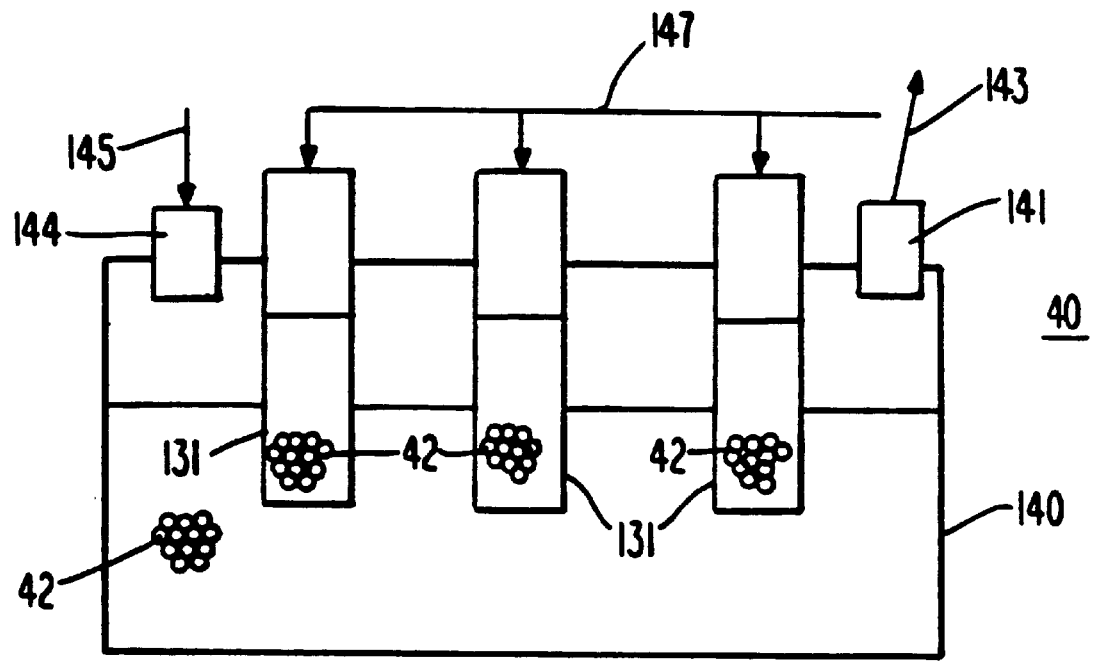
FIG. 8B is a front view of the embodiment shown in FIG. 8A.

FIGS. 8A and 8B show another embodiment of the present invention where the flameless matrix bed reactor (40) includes a cylindrical vessel (140) that is horizontally mounted. FIG. 8A shows an end view of the cylindrical vessel (140) and FIG. 8B shows a side view. The cylindrical vessel (140) has 3 feed tubes (131), spaced along the length of the cylindrical vessel (140), an exhaust outlet (141) for removing the reacted process stream (143), and a heating inlet (144) for receiving a heating medium (145). A reactable process stream (147) is introduced into the feed tubes (131) and is reacted in discrete, non-planar reaction waves (111). Optionally, supplemental air, supplemental fuel, or a combination thereof may be fed into the reactable process stream. The reacted process stream (143) then exits through the exhaust outlet (141).

Among the advantages of the present invention is the simplicity and flexibility of the design of the flameless matrix bed reactor. For example, the present invention—in preferably using a mixing device in combination with a feed tube—eliminates the desirability of having a plenum or distributor and support plate within the flameless matrix bed reactor to evenly distribute the reactable process stream being fed into the matrix bed. By eliminating the plenum or distributor and support plate, the overall cost of the flameless matrix bed reactor can be reduced. Also, by having a mixing device, as opposed to a plenum or distributor and support plate, the need for having long runs of piping to mix the components of the reactable process stream is eliminated. The elimination of such long runs of piping increases the overall safety of the system because mixtures of chemicals have less opportunity to ignite unexpectedly, and if ignited, less energy is released.

Another advantage is that the control of the non-planar reaction wave in the present invention is simplified in comparison to a planar reaction wave. One reason for this simplification is that a non-planar reaction wave tends to withstand process fluctuations more readily in comparison to a planar reaction wave. For example, when the process stream flow rate is increased, typically, the linear displacement of the non-planar reaction wave will be less than the linear displacement of a planar reaction wave under comparable process conditions. As a result of this stability, the present invention preferably uses a maximum of 7 temperature sensors and more preferably a maximum of 3 temperature sensors. In contrast, a typical flameless matrix bed reactor generating a planar reaction wave is more sensitive to process fluctuations and typically requires the temperature to be monitored in more locations within the matrix bed. The monitoring of temperature with a planar reaction wave is especially more extensive when a high turndown ratio is required which in turn causes the planar reaction wave to be displaced to accommodate the changes in flow of the process stream.

The flameless matrix bed reactor of the present invention also has a flexible design. For example, the design is adaptable for reacting gas or liquid chemicals, or a combination of both. Additionally, the flameless matrix bed reactor may be used to efficiently maintain the interior surface of the feed tubes at a temperature above the stable film boiling temperature to enhance vaporization of liquid droplets and prevent vaporized liquid from condensing. This can be done by using the heat from the reacted process stream to heat the interior surfaces of the feed tubes by heat transfer.

In addition to the simplicity and flexibility of design, the non-planar reaction wave provides additional advantages. For example, the non-planar reaction wave has an increased reaction area in comparison to a planar reaction wave, based on both the planar and non-planar reaction waves being contained in a vessel having the same cross-sectional area. This increased area of the reaction wave results in increased reactions per volume of the matrix bed, thus increasing the matrix bed's overall volumetric reaction rate. As a result, a less expensive and smaller matrix bed using a non-planar reaction wave will react the same volume of reactant gases as a more expensive and larger matrix bed using a planar reaction wave. Preferably, the volumetric flow rate using the flameless matrix bed reactor of the present invention is from about 0.5 standard cubic feet per minute per feet squared of cross-sectional area of vessel (scfm/ft$^2$) to about 100 scfm/ft$^2$, and more preferably from about 5.0 scfm/ft$^2$ to about 100 scfm/ft$^2$.

The non-planar reaction wave also permits greater turndown. The turndown performance of the present invention is preferably at least 4 to 1. Also, it is anticipated that the turndown performance using a non-planar reaction wave can be 8 to 1, or greater.

The non-planar reaction wave, if controlled properly, also produces a temperature distribution that leads to a hot wall vessel. Hot walls are desired to prevent the condensation of corrosive compounds (such as halogenated or sulfur-containing compounds generating acidic gases) on the interior surfaces of the vessel. As described previously, it is preferred that the interior surfaces of the vessel are maintained at a temperature of at least about 175° F., preferably at least about 250° F., more preferably at least about 300° F., and most preferably at least about 350° F. The desired temperature of the vessel's interior surfaces will depend on the chemical being reacted and its by products. For example, lower surface temperatures (such as around 175° F. or greater) are acceptable for halogenated gases, where as higher surface temperatures (such as around 350° F. or greater) are acceptable for sulfur containing acids.

By preventing the condensation of corrosive compounds, corrosion of the vessel is reduced. This reduction in corrosion extends the life of the vessel as well as permitting the vessel to be constructed from less expensive materials such as carbon steel, which are not as corrosion resistant as other alloys such as stainless steel or Hastelloy.

EXAMPLE

Figure 9:
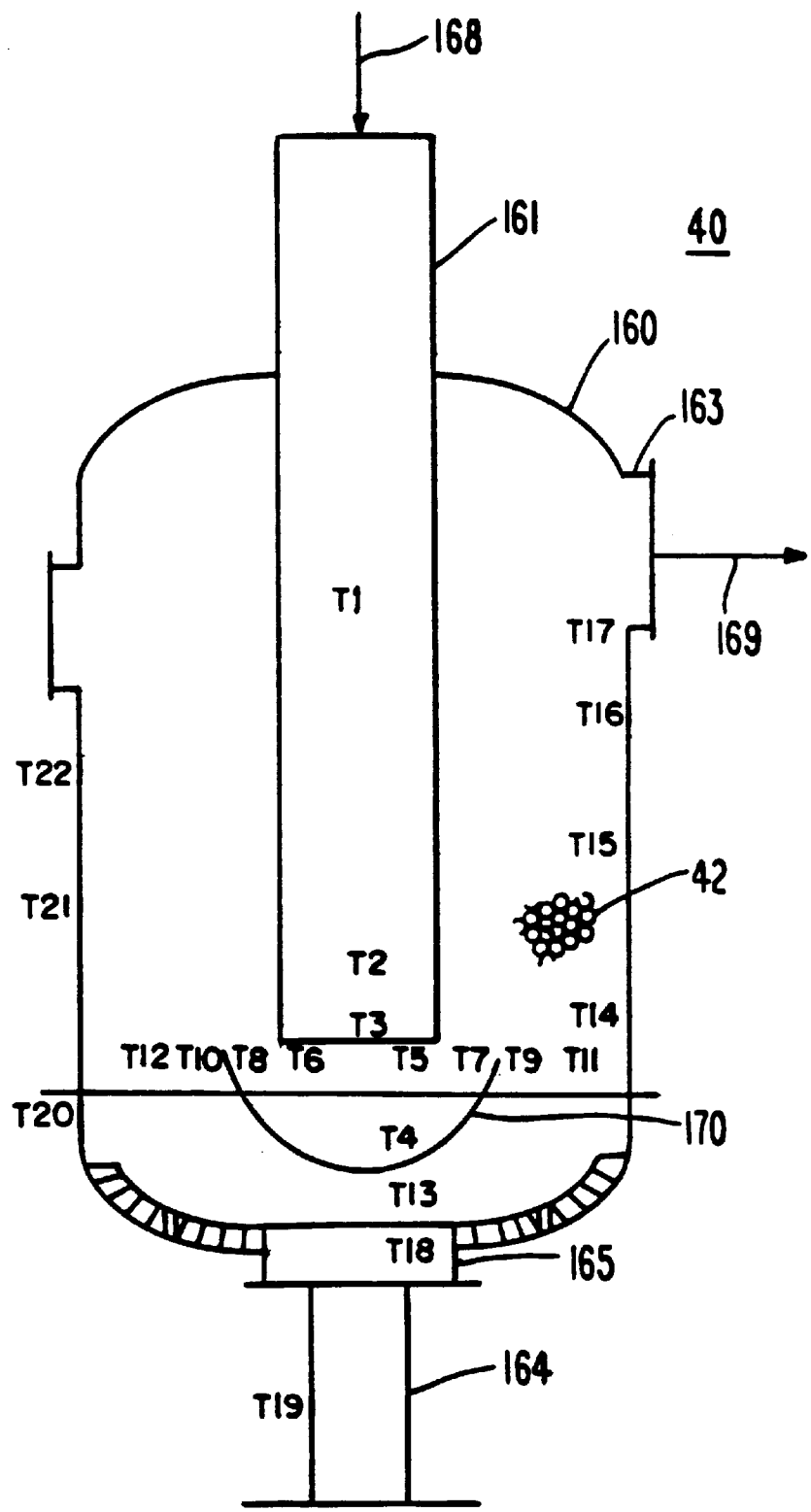
FIG. 9 is a schematic representation of a flameless matrix bed reactor used to obtain the temperature data in Table 1.

An embodiment of the flameless matrix bed reactor of the present invention was tested to demonstrate the ability of the flameless matrix bed reactor to establish and maintain a non-planar reaction wave. In FIG. 9, a schematic diagram of a flameless matrix bed reactor (40) is shown that was operated to establish and maintain a self-sustaining non-planar reaction wave. The flameless matrix bed reactor used included a vessel (160) made of 310 stainless and carbon steel containing a matrix bed (42) of 1 inch ceramic saddles; a feed tube (161), made of 310 stainless steel that was insulated (not shown); an exhaust outlet (163); a heater (164) similar to the heating device in FIG. 3; and a heating inlet (165). The interior surface of the vessel (160) was lined with refractory materials (not shown). Locations where temperature measurements were taken using chromel alumel type thermocouples are numbered T1 through T22 on FIG. 9.

The flameless matrix bed reactor was first preheated to establish a matrix bed temperature of 1400° F. measured at location T9. After the matrix bed was heated, the preheater was turned off and a reactable process stream (168) containing air and 4 volume percent natural gas, based on total volume, was introduced into the feed tube (161) at a rate of 1500 standard cubic feet per minute. A self sustaining non-planar reaction wave (170) was established in a region following the exit of the feed tube (161) so as to oxidize the process stream. The reacted process stream (169) exiting the matrix bed reactor had no measurable carbon monoxide and an oxygen content of 13.5% by dry volume as measured by an extractive electrochemical oxygen sensor. Average steady state temperature measurements taken after a time period of 12 hours are shown in Table 1 below for various locations in the flameless matrix bed reactor.

TABLE 1

Temperature Profile in Flameless Matrix bed reactor

| Temperature Sensor | Location | Average Temperature (F.) |
|---|---|---|
| T1 | Feed tube | 132 |
| T2 | Feed tube | 165 |
| T3 | Feed tube (exit) | 171 |
| T4 | Bed before wave | 323 |
| T5 | Bed before wave | 169 |
| T6 | Bed before wave | 183 |
| T7 | Bed before wave | 184 |
| T8 | Bed before wave | 263 |
| T9 | Bed after wave | 1693 |
| T10 | Bed after wave | 1921 |
| T11 | Bed after wave | 1787 |
| T12 | Bed after wave | 1419 |
| T13 | Bed after wave | 1749 |
| T14 | Bed between feed tube and side wall | 1804 |
| T15 | Bed between feed tube and side wall | 1764 |
| T16 | Bed between feed tube and side wall | 1708 |
| T17 | Bed near exhaust outlet | 1623 |
| T18 | Heat inlet | 1244 |
| T19 | Preheater shell temperature | 466 |
| T20 | Vessel interior surface temperature | 325 |
| T21 | Vessel interior surface temperature | 320 |
| T22 | Vessel interior surface temperature | 360 |

The results in Table 1 show that the flameless matrix bed reactor of the present invention is capable of establishing and maintaining a non-planar reaction wave. The approximate location of the non-planar reaction wave (170) in the bed, based on temperature readings, is approximately in the bed between temperature sensors T4–T8 (before the wave) and T9–T13 (after the wave). The data also shows that the non-planar reaction wave results in the vessel having "hot walls" (T20–T22), so as to help prevent corrosive compounds from condensing on the vessel walls.

Figure 1:
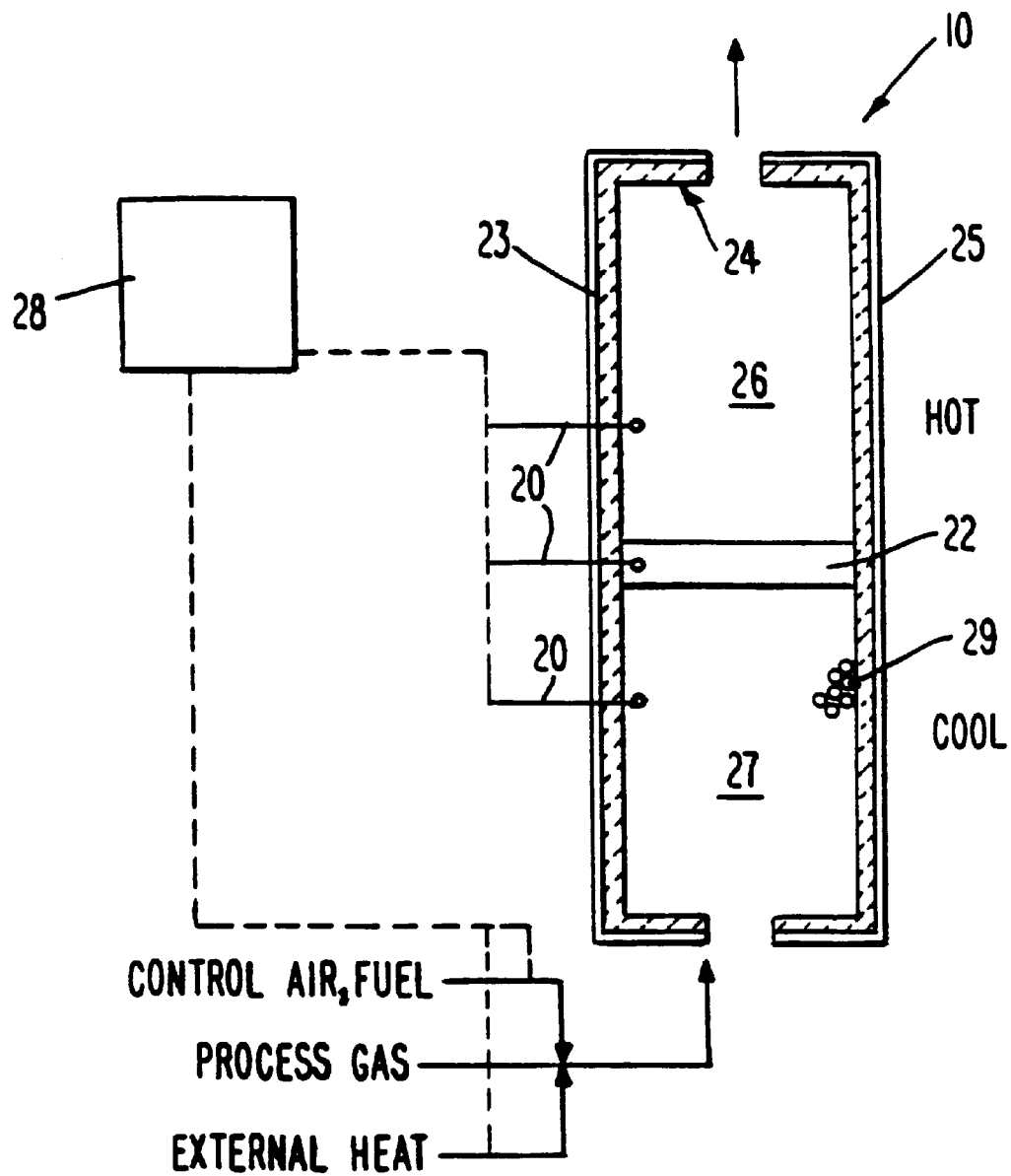
FIG. 1 shows the temperature profile in a flameless matrix bed reactor having a planar reaction wave.

The temperature profile in the flameless matrix bed reactor shown in FIG. 9 can be contrasted with a typical temperature profile for a flameless matrix bed reactor producing a planar reaction wave. Such a profile is shown in Comparative FIG. 1. In Comparative FIG. 1, there is a cool zone (27) prior to the planar reaction wave (22) where there is the potential for corrosive compounds to condense on the vessel walls. Additionally, the planar reaction wave (22) is flat and has a uniform temperature radially.

Although the present invention has been described above with respect to particular preferred embodiments, it will be apparent to those skilled in the art that numerous modifications and variations can be made to those designs. The descriptions provided are for illustrative purposes and are not intended to limit the invention.

What is claimed is:

1. A method of reacting one or more chemicals in a vessel having a matrix bed of porous inert media comprising the steps of:
   a) forming a process stream comprising the chemicals;
   b) heating at least a portion of the matrix bed to at least the reaction temperature of the one or more chemicals;
   c) feeding the process stream into the vessel through one or more feed tubes extending into the matrix bed, wherein each of the feed tubes has an entrance end, an exit end, an interior surface, and an exterior surface, and wherein the vessel has interior surfaces, an entrance side for receiving the feed tubes, an end side opposite to the entrance side, and an exhaust outlet;
   d) directing the process stream through the feed tubes and into the matrix bed, wherein the process stream exiting the feed tubes is homogeneous and at a temperature below the reaction temperature of the one or more chemicals;
   e) establishing and maintaining at least one non-planar reaction wave in the matrix bed, wherein at least a portion of the chemicals are reacted in the non-planar reaction wave to form a reacted process stream and heat and the heat from the non-planar reaction wave maintains the interior surfaces of the vessel at a temperature of at least about 175° F. during operation of the vessel; and
   f) directing the reacted process stream, countercurrent to the flow of the process stream in the feed tubes, through the matrix bed and into the exhaust outlet of the vessel.

2. The method of claim 1 wherein at least a portion of the exterior of each of the feed tubes that passes through the entrance side of the vessel is insulated.

3. The method of claim 2, wherein the distance from the exit end of the feed tube to the end side of the vessel is from about 1.0 to about 10.0 times the diameter of the feed tube.

4. The method of claim 3, wherein the distance from the exit end of the feed tube to the exhaust outlet of the vessel is from about 0.5 to about 10 times the diameter of the vessel.

5. The method of claim 2, wherein the interior surfaces of the vessel are maintained at a temperature of at least about 250° F. to inhibit corrosion.

6. The method of claim 1 wherein the vessel has an internal lining of one or more refractory materials located adjacent to the interior surfaces of the vessel.

7. The method of claim 1 wherein at least a portion of the interior of each of the feed tubes comprises porous inert media.

8. The method of claim 1 wherein the ratio of the length of the feed tube contained within the vessel to the vessel length measured from the vessel end to the vessel exhaust outlet is from about 0.1 to about 0.9.

9. The method of claim 1 wherein the ratio of the total cross-sectional area of the feed tubes to the cross-sectional area of the vessel at the exit ends of the feed tubes is from about 0.005 to about 0.5.

10. The method of claim 1 wherein the process stream is fed downward through the feed tubes.

11. The method of claim 1 wherein at least one of the chemicals is a liquid that is atomized prior to entering the feed tubes.

12. The method of claim 11 wherein the atomized liquid is vaporized by a method comprising heating the interior surface of the feed tubes to at least the stable film boiling temperature of the liquid, contacting the atomized liquid with a heated medium, or contacting the atomized liquid with a heated apparatus, or a combination thereof.

13. The method of claim 11 wherein the interior surface of the feed tubes is maintained at a temperature of at least the stable film boiling temperature of the liquid.

14. The method of claim 13 wherein the heat from the reacted process stream is used to heat the interior surface of the feed tubes.

15. The method of claim 1 wherein a heating device is used to stabilize the non-planar reaction wave during operation of the vessel.

16. The method of claim 15 wherein the heating device comprises one or more internal heating elements extending into the matrix bed from the end side of the vessel, and wherein the heating device is operated intermittently or continuously.

17. The method of claim 1 wherein more than one non-planar reaction wave is established.

18. The method of claim 1 wherein the non-planar reaction wave is substantially spherical and the ends of the non-planar reaction wave attach onto the exit end of the feed tube to form a seal around the feed tube.

19. The method of claim 1 wherein the reaction is an oxidation reaction.

20. The method of claim 19 wherein the non-planar reaction wave is maintained by adjusting the volumetric flow rate of the process stream, adjusting the composition of the process stream, feeding supplemental oxidizing agent into the matrix bed, or feeding supplemental fuel into the matrix bed, or a combination thereof.

21. The method of claim 1 wherein the non-planar reaction wave is maintained by adjusting the volumetric flow rate of the process stream, adjusting the composition of the process stream, or feeding supplemental fuel into the matrix bed, or a combination thereof.

22. An apparatus for reacting chemicals in a matrix bed comprising:
   a) a vessel having interior surfaces, an entrance side, an end side opposite to the entrance side, and at least one exhaust outlet;
   b) a matrix bed comprising porous inert media, wherein the matrix bed is contained within the vessel;
   c) a void space located between the matrix bed and entrance side of the vessel, wherein the exhaust outlet is connected to the matrix bed or void space;
   d) one or more feed tubes, wherein the feed tubes enter the vessel through the entrance side of the vessel and extend into the matrix bed and have an inlet end, an exit end, an interior surface, and an exterior surface, wherein at least a portion of the exterior of each of the feed tubes that passes through the entrance side of the vessel is insulated, and wherein the ratio of the length of the feed tube contained within the vessel to the vessel length measured from the vessel end to the vessel exhaust outlet is from about 0.1 to about 0.9 and the total cross sectional area of the feed tubes to the vessel cross-sectional area is from about 0.005 to about 0.5;

e) means for heating at least a portion of the matrix bed to the reaction temperature of the one or more chemicals;

f) a mixing device capable of providing a process stream through the feed tubes to the matrix bed in a homogeneous form; and g) means for maintaining at least one non-planar reaction wave in the matrix bed in a manner such that the non-planar reaction wave provides heat for maintaining the interior surfaces of the vessel at a temperature of at least about 175° F.

23. The apparatus of claim 22 wherein the vessel has an internal lining of one or more refractory materials located adjacent to the interior surfaces of the vessel.

24. The apparatus of claim 22 wherein at least a portion of the interior of each of the feed tubes contains porous inert media.

25. The apparatus of claim 22 wherein the feed tubes are positioned to direct the flow of the process stream downward to the matrix bed.

26. The apparatus of claim 22 wherein the apparatus comprises more than one feed tube and wherein the ratio of the spacing between the feed tubes to the feed tube diameter is from about 1.2 to about 15.

27. The apparatus of claim 22 wherein at least one of the chemicals is a liquid and the apparatus further comprises a means for atomizing the liquid prior to the chemical being introduced to the matrix bed in the process stream.

28. The apparatus of claim 27 further comprising a means for vaporizing the liquid, wherein the means for vaporizing comprises a means for contacting the liquid with a heated medium, a means for contacting the liquid with a heated apparatus, or a means for maintaining the interior of each of the feed tubes at a temperature of at least the stable film boiling temperature of the liquid, or a combination thereof.

29. The apparatus of claim 28, wherein the means for vaporizing comprises a means for maintaining the interior of each of the feed tubes at a temperature of at least the stable film boiling temperature of the liquid.

30. The apparatus of claim 29 wherein the means for maintaining the interior of each of the feed tubes at a temperature of at least the stable film boiling temperature of the liquid is the reaction heat provided by the non-planar reaction wave.

31. The apparatus of claim 22 further comprising a means for increasing the volumetric flow rate of the process stream, wherein said means comprises a heating device operated intermittently or continuously during the feeding of the process stream to the matrix bed.

32. The apparatus of claim 31 wherein the heating device comprises one or more internal heating elements extending into the matrix bed from the end side of the vessel.

33. The apparatus of claim 22, further comprising means for generating more than one non-planar reaction wave.

34. The apparatus of claim 22 wherein the means for maintaining the non-planar reaction wave comprises:

(i) temperature sensors for measuring the temperature of the matrix bed; and (ii) means for adjusting the flow rate of the process stream.

35. The apparatus of claim 34 further comprising a control system capable of accepting input from the temperature sensors and, in response thereto, controlling the means for adjusting the flow rate of the process stream.

36. The apparatus of claim 22 wherein the means for maintaining the non-planar reaction wave comprises:

(I) temperature sensors for measuring the temperature of the matrix bed;

(ii) one or more inlets for supplemental air, oxygen, or fuel; and (iii) means for adjusting the flow rate of the supplemental air, oxygen, or fuel.

37. The apparatus of claim 36 further comprising a control system capable of accepting input from the temperature sensors and, in response thereto, controlling the means for adjusting the flow rate of the supplemental air, oxygen, or fuel.

38. The apparatus of claim 22 wherein the mixing device is located internally within the feed tubes.

39. The apparatus of claim 22 wherein the mixing device is selected from the group consisting of a static mixer, a mixing tee, and a swirl mixer.

40. The apparatus of claim 39 wherein the mixing device is a swirl mixer.

41. The apparatus of claim 22 wherein the heat resistant material is selected from the group consisting of ceramic balls, ceramic saddles, ceramic pall rings, and ceramic raschig rings.

42. The apparatus of claim 22 wherein the distance measured from the exit end of the feed tube to the end side of the vessel is from about 1.0 to about 10 times the feed tube diameter.

* * * * *